(12) United States Patent
Furukawa et al.

(10) Patent No.: US 7,516,242 B2
(45) Date of Patent: *Apr. 7, 2009

(54) INTEGRATED INFORMATION COMMUNICATION SYSTEM USING CONVERSION TABLE TO CONVERT AN EXTERNAL PACKET INTO AN INTERNAL PACKET BY EMBEDDING A HEADER

(75) Inventors: Hisao Furukawa, Saitama (JP); Shoji Miyaguchi, Chiba (JP)

(73) Assignees: The Distribution Systems Research Institute, Tokyo (JP); Miyaguchi Research Co., Ltd., Chiba (JP)

( * ) Notice: Subject to any disclaimer, the term of this patent is extended or adjusted under 35 U.S.C. 154(b) by 327 days.

This patent is subject to a terminal disclaimer.

(21) Appl. No.: 11/254,943

(22) Filed: Oct. 19, 2005

(65) Prior Publication Data

US 2006/0036768 A1 Feb. 16, 2006

Related U.S. Application Data

(63) Continuation of application No. 09/899,404, filed on Jul. 5, 2001, now Pat. No. 7,028,100.

(30) Foreign Application Priority Data

Jul. 12, 2000 (JP) ............................. 2000-211451
May 9, 2001 (JP) ............................. 2001-138298

(51) Int. Cl.
*G06F 15/16* (2006.01)
(52) U.S. Cl. ..................... 709/245; 709/225; 709/238
(58) Field of Classification Search ............... 709/245, 709/238, 239, 225; 726/15, 11; 370/392; 713/154
See application file for complete search history.

(56) References Cited

U.S. PATENT DOCUMENTS 5,751,971 A 5/1998 Dobbins et al. ........ 395/200.68

(Continued)

FOREIGN PATENT DOCUMENTS

EP 0 698 975 A2 2/1996

(Continued)

OTHER PUBLICATIONS

Newton's Telecom Dictionary, CNP books, 2004, p. 481.

(Continued)

*Primary Examiner*—Le Luu
(74) *Attorney, Agent, or Firm*—Ladas & Parry, LLP

(57) ABSTRACT

An integrated information communication system capable of improving information security is provided, in which an IP packet is detected which is sent from an external area toward either an operation management server or a relay apparatus, the detected IP packet is not entered inside the integrated information communication system in order to reduce such a chance that the operation management server and the relay apparatus are unfairly attacked. Also, such an IP packet is detected and discarded, which violates an address application rule established so as to keep secret of a communication company network. An address which is applied to either an operation management server or a relay apparatus employed in the integrated information communication system is sectioned, or classified as an "address which is not opened outside network" with respect to an external area of the communication system. A packet filter is installed in an address control apparatus.

11 Claims, 21 Drawing Sheets

U.S. PATENT DOCUMENTS

| | | | |
|---|---|---|---|
| 5,793,763 A | 8/1998 | Mayes et al. | 370/389 |
| 5,898,830 A | 4/1999 | Wesinger, Jr. et al. | 395/187.01 |
| 5,999,612 A | 12/1999 | Dunn et al. | 379/212 |
| 6,006,258 A | 12/1999 | Kalajan | 709/219 |
| 6,006,272 A | 12/1999 | Aravamudan et al. | 709/245 |
| 6,069,890 A | 5/2000 | White et al. | 370/352 |
| 6,075,783 A | 6/2000 | Voit | 370/352 |
| 6,094,431 A | 7/2000 | Yamato et al. | 370/395 |
| 6,104,711 A | 8/2000 | Voit | 370/352 |
| 6,145,011 A | 11/2000 | Furukawa et al. | 709/245 |
| 6,233,234 B1 | 5/2001 | Curry et al. | 370/356 |
| 6,243,379 B1 | 6/2001 | Veerina et al. | 370/389 |
| 6,249,820 B1 | 6/2001 | Dobbins et al. | 709/245 |
| 6,252,952 B1 | 6/2001 | Kung et al. | 379/114.1 |
| 6,295,293 B1 | 9/2001 | Tonnby et al. | 370/389 |
| 6,308,148 B1 | 10/2001 | Bruins et al. | 703/27 |
| 6,321,337 B1 | 11/2001 | Reshef et al. | 726/14 |
| 6,324,280 B2 | 11/2001 | Dunn et al. | 379/230 |
| 6,339,594 B1 | 1/2002 | Civanlar et al. | 370/352 |
| 6,353,614 B1 | 3/2002 | Borella et al. | 370/369 |
| 6,396,840 B1 | 5/2002 | Rose et al. | 370/401 |
| 6,457,061 B1 | 9/2002 | Bal et al. | 709/245 |
| 6,523,069 B1 | 2/2003 | Luczycki et al. | 709/249 |
| 6,618,366 B1 | 9/2003 | Furukawa et al. | 370/338 |
| 6,654,456 B1 | 11/2003 | Mandalia et al. | 379/220.01 |
| 6,711,623 B1 | 3/2004 | Furukawa et al. | 709/249 |
| 6,724,747 B1 | 4/2004 | Arango et al. | 370/352 |
| 6,934,278 B1 | 8/2005 | Champa et al. | 370/352 |
| 6,970,941 B1 * | 11/2005 | Caronni et al. | 709/238 |
| 6,977,929 B1 * | 12/2005 | Caronni et al. | 370/392 |
| 6,987,781 B1 | 1/2006 | Miller et al. | 370/496 |
| 7,006,433 B1 | 2/2006 | Dantu et al. | 370/218 |
| 7,028,100 B2 * | 4/2006 | Furukawa et al. | 709/245 |
| 7,032,242 B1 * | 4/2006 | Grabelsky et al. | 726/11 |
| 7,047,561 B1 | 5/2006 | Lee | 726/12 |
| 7,107,614 B1 * | 9/2006 | Boden et al. | 726/15 |
| 2002/0009073 A1 | 1/2002 | Furukawa et al. | 370/352 |
| 2002/0118676 A1 | 8/2002 | Tonnby et al. | 370/352 |
| 2002/0152311 A1 | 10/2002 | Veltman et al. | 709/227 |
| 2002/0196782 A1 | 12/2002 | Furukawa et al. | 370/352 |
| 2004/0054810 A1 | 3/2004 | Furukawa et al. | 709/249 |
| 2005/0086379 A1 | 4/2005 | Asami et al. | 709/245 |

FOREIGN PATENT DOCUMENTS

| | | |
|---|---|---|
| EP | 0 825 748 A2 | 2/1998 |
| EP | 0 851 653 A2 | 7/1998 |
| EP | 0 928 095 A2 | 7/1999 |
| EP | 0 973 343 A1 | 1/2000 |
| EP | 1 054 568 A2 | 11/2000 |
| GB | 2 313 981 | 12/1997 |
| GB | 2 320 167 | 6/1998 |
| GB | 2 332 818 | 6/1999 |
| GB | 2 352 111 | 1/2001 |
| JP | 11-088438 | 3/1999 |
| JP | 128956/19999 | 5/1999 |
| JP | 3084681 | 9/2000 |
| WO | 97/23078 | 6/1997 |
| WO | 97/28628 | 8/1997 |
| WO | 97/31492 | 8/1997 |
| WO | 97/48051 | 12/1997 |
| WO | 98/06201 | 2/1998 |
| WO | 98/20724 | 5/1998 |
| WO | 98/30008 | 7/1998 |
| WO | 98/59523 | 12/1998 |
| WO | 99/14931 | 3/1999 |
| WO | 99/28827 | 6/1999 |
| WO | 99/37061 | 7/1999 |
| WO | 00/51331 | 8/2000 |
| WO | 01/24499 | 4/2001 |
| WO | 01/37529 A1 | 5/2001 |

OTHER PUBLICATIONS

Black, ISDN and SS7, Prentice Hall, pp. 32-33 (1997).

Nagami, K., et al., "VCID Notification for Label Switching," IEICE Transactions on Information and Comm. Eng. Tokyo, JP, vol. E82-D, No. 4, pp. 863-869, (Apr. 1999).

Anquetil, L.-P., et al., "Media Gateway Control Protocol and Voice Over IP Gateways," *Alcatel Telecommunications Review*, 2nd Quarter, pp. 151-157 (1999).

Gbaguidi, C., et al., "A Programmable Architecture for the Provision of Hybrid Services," *IEEE Communications Magazine*, pp. 110-116 (Jul. 1999).

Hamdi, M., et al., "Voice Service Interworking for PSTN and IP Networks," *IEEE Communications Magazine*, pp. 104-111 (May 1999).

Hui, S.C., et al., "Towards a Standards-Based Internet Telelphony System," *Computer Standards & Interfaces*, vol. 19, pp. 89-103 (1998).

Hunt, R., "Internet/Intranet Firewall Security-Policy, Architecture, and Transaction Services," *Computer Communications*, vol. 21, pp. 1107-1123 (1998).

Malkin, G.S., "Dial-In Virtual Private Networks Using Layer 3 Tunneling," *IEEE*, pp. 555-561 (1997).

"Packet-based multimedia communications system," *ITU-T Recommendation H.323—Annex D*, (Sep. 1998) 10 pages.

Australian Written Opinion for Singapore Patent Application No. SG 200102034-6 (Date: Jun. 24, 2002; No. of pp. 6).

European Search Report for EPO Patent Application No. EP 01200880 (Date: Nov. 28, 2002; No. of pp. 4).

European Search Report (14 pages), which was mailed on Oct. 20, 2003, for European Patent Application No. 01200880.1.

* cited by examiner

--PRIOR ART--

--PRIOR ART--

FIG.7 ~17

| Internal Source Address | External Source Address | External Destination Address | Internal Destination Address | Request Identification | Priority Degree | Charge Identifier |
|---|---|---|---|---|---|---|
| U | — | — | V | 3 | 4 | Fa01 |
| X | a | k | Y | 1 | 2 | Fa02 |
| X | b | m | Z | 1 | 2 | Fa03 |
| X | c | — | — | 2 | 0 | Fa04 |
| X | d | f | — | 2 | 0 | Fa05 |
| .. | .. | .. | .. | .. | .. | .. |

FIG.8 ~18

| Internal Source Address | External Source Address | External Destination Address | Internal Destination Address | Request Identification | Priority Degree | Charge Identifier |
|---|---|---|---|---|---|---|
| P | — | f | — | 2 | 0 | Fb01 |
| .. | .. | .. | .. | .. | .. | .. |

FIG.9 ~19

| Internal Source Address | External Source Address | Source address mask | Destination address mask | External Destination Address | Internal Destination Address | Request Identification | Priority Degree | Charge Identifier |
|---|---|---|---|---|---|---|---|---|
| W | h | — | — | — | — | 2 | 0 | Fd01 |
| Z | mx | MSK1 | MKD1 | bx | X | 1 | 2 | Fd02 |
| Z | fx | MKS2 | — | — | — | 2 | 0 | Fd03 |
| .. | .. | .. | .. | .. | .. | .. | .. | .. |

FIG.10 ~20

| Internal Source Address | External Source Address | Permission to send | Permission to receive | Permission to dest. | External Dest. Address | Internal Dest. Address | Request Identification | Priority Degree | Charge Identifier |
|---|---|---|---|---|---|---|---|---|---|
| V | — | — | — | — | — | U | 3 | 4 | Fc01 |
| Y | k | YES | YES | YES | a | X | 1 | 2 | Fc02 |
| Y | e | YES | YES | — | — | — | 2 | 0 | Fc03 |
| .. | .. | .. | .. | .. | .. | .. | .. | .. | .. |

FIG.25

(Address Management Table) 2412-1 — 2412

| Internal Destination Address | External Destination Address | External Source Address | Internal Source Address | Request Identification n | Packet Reception Priority Symbol | CheckArea Identifier |
|---|---|---|---|---|---|---|
| 7821 | 2100 | 2500 | 7200 | 1 | pr-7821 | 1 |
| 7821 | 2110 | 2600 | 7300 | 1 | pr-7821 | 1 |
| 7822 | 1200 | 1230 | 7400 | 1 | pr-7822 | 2 |
| 7822 | 1210 | 1240 | 7400 | 1 | pr-7822 | 2 |
| 7822 | 1220 | 1250 | 7500 | 1 | pr-7822 | 3 |
| 7823 | 2200 | 2610 | 7300 | 1 | pr-7823 | 3 |
| 7823 | 2210 | 2700 | 7600 | 1 | pr-7823 | 3 |
| 7824 | 2300 | 2710 | 7600 | 1 | pr-7824 | 3 |
| 7824 | 2310 | 2800 | 7700 | 1 | pr-7824 | 3 |
| 7825 | 2400 | 2720 | 7600 | 1 | pr-7825 | 3 |
| 7825 | 2410 | 2810 | 7700 | 1 | pr-7825 | 3 |
| .. | .. | .. | .. | 8 | .. | .. |

2412-2

| Packet Reception Priority Symbol | Protocol Priority Degree | TCP Socket Priority Degree | UDP Socket Priority Degree |
|---|---|---|---|
| pr-7821 | p-1 | t-1 | NULL |
| pr-7822 | p-1 | t-2 | NULL |
| pr-7823 | p-2 | NULL | u-1 |
| pr-7824 | p-2 | NULL | u-2 |
| pr-7825 | p-1 | t-3 | u-3 |
| .. | .. | .. | .. |

2412-3

| Protocol Priority Degree ( High Priority Degree · Low Priority Degree ) | |
|---|---|
| p-1 | TCP, UDP, ICMP, IGMP |
| p-2 | UDP, TCP, ICMP, IGMP |
| p-3 | ICMP, IGMP, UDP, TCP, |

2412-4

| TCP Socket Priority Degree | |
|---|---|
| t-1 | sk-1, sk-7 |
| t-2 | sk-2 |
| t-3 | sk-5 |

2412-5

| UDP Socket Priority Degree | |
|---|---|
| u-1 | sk-3, sk-8 |
| u-2 | sk-4 |
| u-3 | sk-6 |

2412-6

| Socket Designation | | | |
|---|---|---|---|
| Socket Code | From/To | IP-Address | port No. |
| sk-1 | To | 2100 | 30 |
| sk-2 | From | 1240 | 32 |
| sk-3 | To | 2200 | 40 |
| sk-4 | From | 2710 | 40 |

2412-7

| Socket Designation | | | |
|---|---|---|---|
| Socket Code | From/To | IP-Address | port No. |
| sk-5 | To | 2400 | 50 |
| sk-6 | From | 2810 | 52 |
| sk-7 | From | 2600 | 130 |
| sk-8 | From | 2700 | 140 |

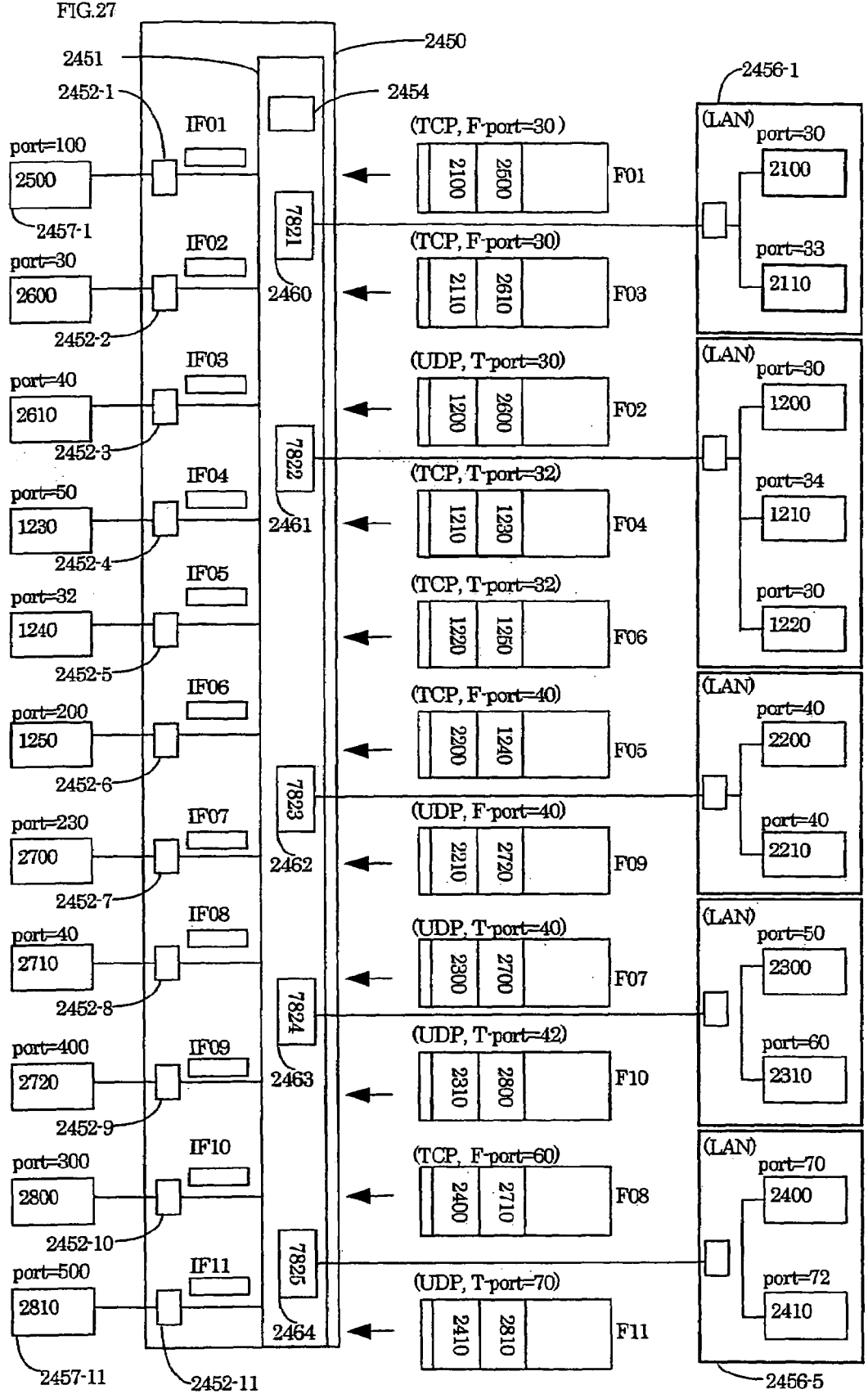

(Address Management Table) — 2454-1

| Internal Source Address | External Source Address | External Destination Address | Internal Destination Address | Request Identification | Packet Transmission Priority Symbol | Closed Area Identifier |
|---|---|---|---|---|---|---|
| 7821 | 2100 | 2500 | 7200 | 1 | ps-7200 | 2 |
| 7821 | 2110 | 2610 | 7300 | 1 | ps-7300 | 2 |
| 7822 | 1200 | 2600 | 7201 | 1 | ps-7200 | 2 |
| 7822 | 1210 | 1230 | 7301 | 1 | ps-7300 | 2 |
| 7822 | 1220 | 1250 | 7401 | 1 | ps-7400 | 2 |
| 7823 | 2200 | 1240 | 7400 | 1 | ps-7400 | 2 |
| 7823 | 2210 | 2720 | 7600 | 1 | ps-7600 | 5 |
| 7824 | 2300 | 2700 | 7500 | 1 | ps-7500 | 5 |
| 7824 | 2310 | 2800 | 7601 | 1 | ps-7600 | 5 |
| 7825 | 2400 | 2710 | 7501 | 1 | ps-7500 | 5 |
| 7825 | 2410 | 2810 | 7602 | 1 | ps-7600 | 5 |
| . . | . . | . . | . . | 3 | . . | . . |

— 2454-2

| Packet Transmission Priority Symbol | Protocol Priority Degree | TCP Socket Priority Degree | UDP Socket Priority Degree |
|---|---|---|---|
| ps-7200 | p-21 | t-21 | NULL |
| ps-7300 | p-21 | t-22 | NULL |
| ps-7400 | p-22 | NULL | u-21 |
| ps-7500 | p-22 | NULL | u-22 |
| ps-7600 | p-21 | t-23 | u-23 |
| ps-0000 | NULL | NULL | NULL |

— 2454-3

| Protocol Priority Degree ( High Priority Degree - Low Priority Degree ) | |
|---|---|
| p-21 | TCP, UDP, ICMP, IGMP |
| p-22 | UDP, TCP, ICMP, IGMP |
| p-23 | ICMP, IGMP, UDP, TCP, |

— 2454-4

| TCP Socket Priority Degree | |
|---|---|
| t-21 | sk-21, sk-27 |
| t-22 | sk-22 |
| t-23 | sk-25 |

— 2454-5

| UDP Socket Priority Degree | |
|---|---|
| u-21 | sk-23, sk-26 |
| u-22 | sk-24 |
| u-23 | sk-28, sk-24 |

— 2454-6

| Socket Designation | | | |
|---|---|---|---|
| Socket Code | From/To | IP-Address | port-No. |
| sk-21 | From | 2110 | 30 |
| sk-22 | To | 1250 | 32 |
| sk-23 | From | NULL | 40 |
| sk-24 | From | 2210 | 40 |

— 2454-7

| Socket Designation | | | |
|---|---|---|---|
| Socket Code | From/To | IP-Address | port-No. |
| sk-25 | From | 2400 | 60 |
| sk-26 | To | NULL | 42 |
| sk-27 | To | 2600 | 130 |
| sk-28 | From | 2410 | 70 |

INTEGRATED INFORMATION COMMUNICATION SYSTEM USING CONVERSION TABLE TO CONVERT AN EXTERNAL PACKET INTO AN INTERNAL PACKET BY EMBEDDING A HEADER

CROSS-REFERENCE TO RELATED APPLICATIONS

This patent application is a continuation application of U.S. Ser. No. 09/899,404, filed on Jul. 5, 2001 now U.S. Pat. No. 7,028,100, which claims priority to Japanese Application No. 2001-138298, filed on May 9, 2001 and to Japanese Application No. 2000-211451, filed on Jul. 12, 2000.

BACKGROUND OF THE INVENTION

1. Field of the Invention

The present invention relates to an integrated information communication system (ICS) in which various information communication appliances such as personal computers, LANs (Local Area Networks), telephones (including cellular phones and PHSs), FAXs (Facsimiles), CATV (Cable Television) and the Internet, and/or various information communication systems are connected to each other in an integrated manner via not only dedicated lines, but also ISDN (Integrated Services Digital Network), FR (Frame Relay), ATM (Asynchronous Transfer Mode), IPX (Integrated Packet Exchange), satellite, wireless and public lines. In this case, while an address (information communication purpose) is applied to an information communication appliance so as to be discriminated from other information communication appliances, this information communication appliance will communicate with other information communication appliances. More specifically, the present invention is directed to such an integrated information communication system that while data transfer services are integrated by employing a connectionless type network (for instance, Internet Protocol techniques of RFC 791 and RFC 1883), economical characteristics of entire information communications are increased by employing a unified address system, and also security is secured, communications can be established among connected terminals, or systems.

2. Description of the Prior Art

As an integrated information communication system (ICS) to which an encapsulation technique has been applied, Japanese Patent No. 3084681 C2 discloses the below-mentioned ICS system owned by the Applicants, the related technical scope of which will be explained as follows:

That is to say, as represented in FIG. 1, the integrated information system is mainly subdivided into an internal area and an external area. In the internal area of the integrated information communication system, a large number of relay apparatus are connected to each other via a communication line having an IP packet transfer function, whereas in a peripheral unit of the integrated information communication system, a plurality of access control apparatus (AC) are provided. The most of LANs used in enterprises are connected via a user communication line to these access control apparatus. The integrated information communication system may realize three sorts of services, for instance, 1) an "intra-corporation communication" service with employment of a private IP address defined by the IETF rule; 2) an "inter-corporation communication" service without using a private IP address; and also 3) a "virtual dedicated line" service which may pretend such a condition that two terminals are virtually and continuously connected to each other by way of an IP communication line.

While IP addresses are selectively used in the external area and the internal area of the integrated information communication system, these IP addresses employed in the external area/internal area of the integrated information communication system are called as "external/internal addresses". An IP packet of the external area of the integrated information communication system is referred to as an "external packet", and an IP packet of the internal area of the integrated information communication system is called as an "internal packet". An external packet sent out from a LAN is entered via a user communication line into an access control apparatus which applies an IP header containing an internal address applied to a logic terminal of the user communication line to the entered external packet, so that the external packet is converted into an internal packet (namely, encapsulation, see FIG. 2). Then, the internal packet is transferred inside the integrated information communication system and thereafter is reached to another access control apparatus by which the IP header is removed from the internal packet (namely, decapsulation). Then, the resultant external packet is sent out via another user communication line toward a terminal provided inside a LAN of a communication counter party.

As shown in FIG. 3, the user communication line is subdivided into a user physical communication line 91, and also user logic communication lines 92-1 and 92-2. A logic contact (termination of user logic communication line) between the user logic communication line (92-1, 92-2) and an access control apparatus 90 is referred to as a logic terminal (93-1, 93-2) to which an internal address of an IP network is applied so as to identify logic terminal. In the example of FIG. 3, the user physical communication line 91 contains the user physical communication lines 92-1 and 92-2, an internal address "U" is applied to the logic terminal 93-1 functioning as a termination, or trailing end (contact between access control apparatus 90 and user logic communication line 92-1) of the user logic communication line 92-1, and an internal address "X" is applied to the logic terminal 93-2 of the termination of the user logic communication line 92-2. Reference numerals 94-1 to 94-3 show terminals connected to the user logic communication lines 92-1 and 92-2. A subdivision of a physical communication line into a plurality of logic communication lines may be realized in, for instance, DLCI of a frame relay and/or VPI/VCI of an ATM network.

Then, the embodiment-15 of the above-described Japanese Patent No. 3084681 C2 discloses the technical method of "non-capsulation of inter-corporation communication". In other words, the following technical method is disclosed: As to the virtual dedicated (exclusively-used) line and the intra-corporation communication, the external packet is encapsulated to produce the internal packet in the access control apparatus, and then, this internal packet is transferred to the internal area of the integrated information communication system. Thereafter, the internal packet is decapsulated so as to recover the external packet in another access control apparatus, and then, the external packet is transmitted via the user communication line to the communication counter party. As to the inter-corporation communication, the external packet is directly regarded as the internal packet, while the external packet is not encapsulated, and then, is transferred to the internal area of the integrated information communication system. Thereafter, the transferred external packet is transmitted from another access control apparatus (provided on the side of packet reception) via the user communication line to the terminal of the communication counter party. Such a technical method is opened in, for example, the above-explained Japanese Patent No. 3084681 C2. That is, a domain name server (DNS) is applied to an integrated information communication network containing such a function that an external IP packet is encapsulated so as to be converted into an internal packet. In this case, when a domain name is inquired, a domain name server (DNS) answers an IP address.

Furthermore, while both the above-explained IP encapsulation technical method and the above-described IP decapsulation technical method are employed as the initial condition, the embodiment-32 of Japanese Patent No. 3084681 C2 discloses the packet reception priority control technique. That is, the internal packets which are reached from the internal area of the integrated information communication system to the access control apparatus are ordered in accordance with the designation of the records of the conversion table employed in the access control apparatus, and then, are sent out to the external area of the integrated information communication system. Also, the embodiment-33 of Japanese Patent No. 3084681 C2 discloses the packet transmission priority control technique. That is, the external packets which are reached from the external area of the integrated information communication system to the access control apparatus are ordered in accordance with the designation of the records of the conversion table employed in the access control apparatus, and then, are sent out to the internal area of the integrated information communication system. The transfer efficiency of the external IP packet and the internal IP packet, which are registered in the record of the conversion table, is improved based upon both the above-described packet reception priority control and also the above-explained packet transmission priority control.

However, the servers installed inside the various sorts of networks are provided in the internal area of the above-described conventional integrated information communication system, while these servers may operate/manage the integrated information communication system. The servers own the respective IP addresses. In the case that such an address range which is not encapsulated is present, the following high risk may occur. That is, the operation management server receives such an unfair attack that a very large amount of IP packets are transmitted from the external area of the IP network to the operation management server, and that secret data of the operation management server is unfairly read out.

SUMMARY OF THE INVENTION

The present invention has been made to solve the above-explained problems, and therefore, has an object to provide an integrated information communication system capable of reducing a chance of an unfair attack to an operation management server and a relay apparatus provided in the integrated information communication system, and also capable of improving information security by way of the following manners. That is, while an IP packet is detected which is sent from an external area of the integrated information communication system to an operation management server and a relay apparatus provided in the integrated information communication system, entering of the detected IP packet into the internal area of the integrated information communication system is prohibited, so that the chance of such an unfair attack can be reduced. Also, addresses of IP packets used in an internal communication of a communication company management network and also a communication established among communication companies are sectioned, and furthermore, such an IP packet is detected to be therefore discarded. The IP packet violates an address application rule which is given in order to keep a secrecy of a communication network. As a result, the information security can be improved.

With respect to an integrated information communication system of the present invention, the above-described object of the present invention can be achieved by such an integrated information communication system including a communication company management network, in which the communication company management network contains an access control apparatus, a relay apparatus, and a server; the access control apparatus, the relay apparatus and the server are mutually connected to each other via an IP communication line; the communication company management network is connected via a boundary relay apparatus to the IP communication line; an external terminal of the integrated information communication system is connected via a user communication line to the access control apparatus, an internal address is applied to a logic terminal so as to identify said logic terminal of a termination of the user communication line, and also the access control apparatus contains a conversion table; in such a case that a request identification of the conversion table implies a virtual dedicated line, identification information of a logic terminal into which an external packet is inputted is registered as a record of the conversion table in such a manner that if the identification information of the logic terminal is determined, then an internal destination address is exclusively determined which is stored in a header of an internal packet produced by an access control apparatus installed on the transmission side; in such a case that the request identification implies a private address communication, a set of identification information of a logic terminal into which an external packet is inputted, an external source address thereof, and an external destination address thereof is registered as a record of the conversion table in such a manner that if the information/address set is determined, then the internal destination address is exclusively determined which is stored into the header of the internal packet produced by the access control apparatus installed on the transmission side; with respect to identification information of the same logic terminal, a set of the external destination address and the internal destination address stored into the header portion is made different from each other every record; and a delivery destination of the external packet can be changed by changing an external destination address contained in an external packet which is entered from the same logic terminal; in such a case that the request identification implies a non-private address communication, a set of the identification information of the logic terminal and the external source address is registered as a record of the conversion table; the registration implies a transmission permission with respect to a terminal having the external source address; the external packet is transmitted from the terminal to the user communication line; it is so detected that the request identification is registered as the virtual dedicated line into the record of the conversion table containing the identification information of the logic terminal into which the external packet is entered; the external packet is converted into the internal packet by employing both the logic terminal identification information and the internal destination address, which are acquired from the conversion table; the internal packet is transferred via the IP communication line and the relay apparatus provided in the integrated information communication system, and also is transferred via a logic terminal of an access control apparatus installed on the reception side to another user communication line so as to be thereby reached to another terminal and when a packet filter employed in the access control apparatus detects that the destination address contained in the external packet corresponds to such an address which is not opened outside network, the packet filter discards the detected external packet.

Also, when it is so found out that the request identification is registered as the private address communication, and also when it is so detected that both the external source address and the external destination address contained in the external packet are registered into the record of the conversion table; the external packet is converted into the internal packet by employing both the logic terminal identification information and the internal destination address which are acquired from the conversion table; when it is so detected that the request identification is registered as a non-private address communication, if the external source address contained in the external packet is registered into the record of the conversion table, then the transmission permission of the terminal having the external source address can be confirmed, so that the external packet is directly used as the internal packet; the internal packet is transferred via the IP communication line and the relay apparatus provided in the integrated information communication system, and also is transferred via a logic terminal of an access control apparatus installed on the reception side to another user communication line so as to be thereby reached to another user terminal and when a packet filter employed in the access control apparatus detects that the destination address contained in the external packet corresponds to such an address which is not opened outside network, the packet filter discards the detected external packet.

Items of source transmitting permission, source receiving permission and destination transmitting permission are optionally provided at the record in the conversion table and the transmitting and receiving of the internal packet are controlled.

The above-explained object of the present invention may be more effectively achieved by that the IP packet is transmitted/received between the communication company management networks by employing an address commonly used between the communication company management networks; when a packet filter of a boundary relay apparatus detects that the destination address contained in the external packet is located in a range of an address which is not opened outside network, the packet filter discards the external packet; and either encryption or a digital signature can be applied which can be agreed by the two communication companies for the IP packet to be transmitted/received.

Both the IP encapsulation operation and the IP decapsulation operation, which are explained in the embodiment-1 and the embodiment-2 of the present invention, may be replaced by both the encapsulation method and the decapsulation method in communication of layer less than 3. For instance, both the IP encapsulation operation and the IP decapsulation operation may be replaced by both an encapsulation operation and a decapsulation operation by a header of an optical HDL frame of layer 2 communication. As a first method, similar to both the IP encapsulation technical method and the IP decapsulation technical method, two internal addresses may be contained in a header which is applied in an encapsulation operation. These two internal addresses may include both an internal destination address and an internal source address. As a second method, while an internal destination address may be contained in the header, an internal source address may not be contained in this header (namely, both simple encapsulation operation and simple decapsulation operation), which will be explained in embodiments-3 to -5 of the present invention. Also, in the first method and the second method, while an internal address of an integrated information communication system is kept secret with respect to the external area of the integrated information communication system, such an unfair attack is presented, the information security of this integrated information communication system can be improved. As this unfair attack, secret data of an operation management server functioning as the subject of the present invention is unfairly read out.

Furthermore, while both the simple encapsulation technical method and the simple decapsulation technical method are employed as the initial condition, both packet reception priority control and the packet transmission priority control are realized. As consequence, the transfer efficiency of either the external IP packet or the internal IP packet, which are registered in the record of the conversion table, can be improved.

An embodiment of the invention relates to an integrated information communication system comprising at least one set of a communication company management network, in which said communication company management network includes an access control apparatus, a relay apparatus, and a server; and said access control apparatus, said relay apparatus, and said server are connected to each other via an internal communication line having a packet transfer function; wherein: when two, or more sets of said communication company management networks are employed, these communication company management networks are connected via a boundary relay apparatus to each other by using said internal communication line; an external terminal of said integrated information communication system is connected via a user communication line to said access control apparatus, an internal address is applied to a logic terminal so as to identify said logic terminal of a termination of said user communication line, and also said access control apparatus contains a conversion table; in such a case that a request identification of said conversion table implies a virtual dedicated line, identification information of a logic terminal into which an external packet is inputted is registered as a record of said conversion table in such a manner that if said identification information of the logic terminal is determined, then an internal destination address is exclusively determined which is stored in a header of an internal packet produced by an access control apparatus installed on the transmission side; in such a case that said request identification implies a private address communication, a set of identification information of a logic terminal into which an external packet is inputted, an external source address thereof, and an external destination address thereof is registered as a record of said conversion table in such a manner that if said information/address set is determined, then said internal destination address is exclusively determined which is stored into the header of the internal packet produced by the access control apparatus installed on the transmission side; with respect to identification information of the same logic terminal, a set of said external destination address and said internal destination address stored into said header portion is made different from each other every record; and a delivery destination of said external packet can be changed by changing an external destination address contained in an external packet which is entered from the same logic terminal; in such a case that said request identification implies a non-private address communication, a set of said identification information of the logic terminal and said source address is registered as a record of said conversion table; said registration implies a transmission permission with respect to a terminal having said external source address; said external packet is reached from said terminal via said user communication line to an access control apparatus; a detection is made of such a fact that as a first case, said request identification is registered as a virtual dedicated line into a record of said conversion table containing the identification information of the logic terminal into which said external packet is inputted; as a second case, said request identification is registered as a private address communication into the record of said conversion table; as a third case, said request identification is registered as a non-private address communication; in both said first case and said second case, said external packet is converted into said internal packet by employing both logic terminal identification information and an internal destination address, which are acquired from said conversion table; in said third case, while said external packet is directly used as an internal packet, said internal packet acquired in said first case to said third case is transferred via said internal communication line and said relay apparatus provided in said integrated information communication system, and also is transferred via a logic terminal of an access control apparatus installed on the reception side to another user communication line so as to be thereby reached to another terminal and when a packet filter employed in said access control apparatus detects that the destination address contained in said external packet corresponds to such an address which is not opened outside network, said packet filter discards said detected external packet.

Another embodiment of the invention relates to an integrated information communication system comprising at least one set of a communication company management network, in which said communication company management network includes an access control apparatus, a relay apparatus, and a server; and said access control apparatus, said relay apparatus, and said server are connected to each other via an internal communication line having a packet transfer function; wherein: when two, or more sets of said communication company management networks are employed, these communication company management networks are connected via a boundary relay apparatus to each other by using said internal communication line; an external terminal of said integrated information communication system is connected via a user communication line to said access control apparatus, an internal address is applied to a logic terminal so as to identify said logic terminal of a termination of said user communication line, and also said access control apparatus contains a conversion table; in such a case that said request identification implies a private address communication, a set of identification information of a logic terminal into which an external packet is inputted, an external source address thereof, and an external destination address thereof is registered as a record of said conversion table in such a manner that if said information/address set is determined, then said internal destination address is exclusively determined which is stored into the header of the internal packet produced by the access control apparatus installed on the transmission side; with respect to identification information of the same logic terminal, a set of said external destination address and said internal destination address stored into said header portion is made different from each other every record; and a delivery destination of said external packet can be changed by changing an external destination address contained in an external packet which is entered from the same logic terminal; in such a case that said request identification contained in said conversion table implies a nonprivate address communication, a set of said identification information of the logic terminal and said source address is registered as a record of said conversion table; said registration implies a transmission permission with respect to a terminal having said external source address; an external packet is reached from a terminal via a user communication line to an access control apparatus; when it is so detected that a request identification is registered as a private address communication as said first case into a record of said conversion table containing the identification information of the logic terminal into which said external packet is inputted, and when it is so detected that both the external source address and the external destination address contained in said external packet are registered as a record of said conversion table, said external packet is converted into said internal packet by employing both the logic terminal identification information and the internal destination address which are acquired from said conversion table; when it is so found out that said request identification is registered as a nonprivate address communication as a second case, if the external source address contained in said external packet is registered into the record of said conversion table, then the transmission permission of the terminal having said external source address can be confirmed, so that said external packet is directly used as said internal packet; said internal packet is transferred via said internal communication line and said relay apparatus provided in said integrated information communication system, and also is transferred via a logic terminal of an access control apparatus installed on the reception side to another user communication line so as to be thereby reached to another terminal and when a packet filter employed in said access control apparatus detects that the destination address contained in said external packet corresponds to such an address which is not opened outside network, said packet filter discards said detected external packet.

According to another embodiment of the invention, said external packet is transmitted/received between said communication company management networks by employing an address commonly used between said communication company management networks; when a packet filter of a boundary relay apparatus detects that the destination address contained in said external packet is located in a range of an address which is not opened outside network, said packet filter discards said external packet; and either encryption or a digital signature can be applied which can be agreed by said two communication companies for said external packet to be transmitted/received.

According to another embodiment of the invention, upper-grade protocol in said IP packet is referred, and a priority degree of next stage of internal packet reached at said access control apparatus from inside of said internal information communication system is selected by designating a record of said conversion table in accordance with a type of said upper-grade protocol.

According to another embodiment of the invention, upper-grade protocol in said IP packet is referred, and a priority degree of next stage of external packet reached at said access control apparatus from outside of said internal information communication system is selected by designating a record of said conversion table in accordance with a type of said upper-grade protocol.

BRIEF DESCRIPTION OF THE DRAWINGS

In the accompanying drawings:

FIG. 7 is a diagram for indicating an example of a conversion table employed in the first embodiment;

FIG. 8 is a diagram for indicating an example of a conversion table employed in the first embodiment;

FIG. 9 is a diagram for indicating an example of a conversion table employed in the first embodiment;

FIG. 10 is a diagram for indicating an example of a conversion table employed in the first embodiment;

FIG. 25 is a diagram for explaining a function of a conversion table employed in the fourth embodiment;

FIG. 27 is a diagram for explaining a function of an integrated information communication system according to a fifth embodiment;

FIG. 28 is a diagram for explaining a function of a conversion table employed in the fifth embodiment.

DESCRIPTION OF THE PREFERRED EMBODIMENTS

In accordance with the present invention, while addresses which are applied to an operation management server and a relay apparatus of a communication company provided in an integrated information communication system of the present invention, are sectioned (classified) as "addresses which are not opened outside network" with respect to an external area of the integrated information communication system, a packet filter is mounted within an access control apparatus. Furthermore, a communication between management networks of communication companies is established via a boundary relay apparatus, and a packet filter is mounted within the boundary relay apparatus.

The packet filter provided in the access control apparatus checks as to whether or not a destination address contained in an external packet which is entered from the external area of the integrated information communication system into the internal area thereof is located within such a range of "addresses which are not opened outside network". In the case that the destination address is located within the range of "addresses which are not opened outside network", the packet filter discards the entered external packet. On the other hand, the packet filter provided in the boundary relay apparatus discards such a packet when it is so detected that a destination address contained in the packet which is transmitted/received between the management networks of the communication companies is located within a range of internal addresses of the communication companies.

First, a description will now be made of a first application rule of IP addresses established based on the present invention with reference to FIG. 4. In the external area of the integrated information communication system, a "private address" is employed in a "private address communication", whereas a "non-private address" is used in a "non-private address communication". In connection thereto, such an IP packet communication method is carried out with respect to the private address, for instance, the address section defined by the RFC rule is employed. The address ranges of "10.0.0.0" to "10.255.255.255", "172.16.0.0" to "172.16.255.255", and "192.168.0.0" to "192.168.255.255" are used as the private address range, whereas all of other address ranges are used as the non-private address range.

Although the embodiment will be explained with reference to IPV4 on the IP packet, it may be applicable to IPV6 by using prior arts. Further, it is possible to divide the private address range into plural address ranges. For example, the above address range is divided into two, the first address range is defined as "10.0.0.0" to "10.255.255.255" and the second address range is defined as the private address range "172.16.0.0" to "172.16.255.255" and "192.168.0.0" to "192.168.255.255". The packet filter is used for discriminating the first address range and the second address range.

Figure 1:
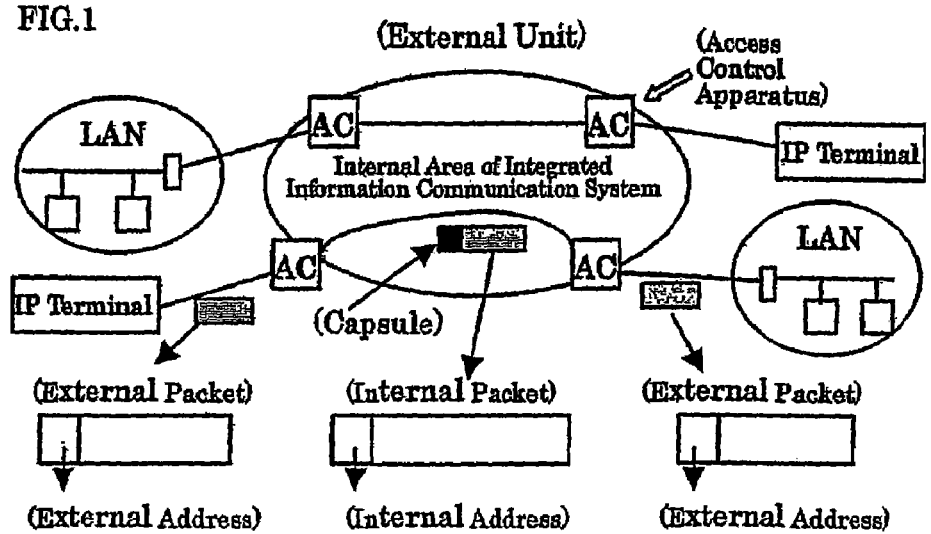
FIG. 1 is a block diagram for indicating a schematic structure of an integrated information communication system.
Figure 2:
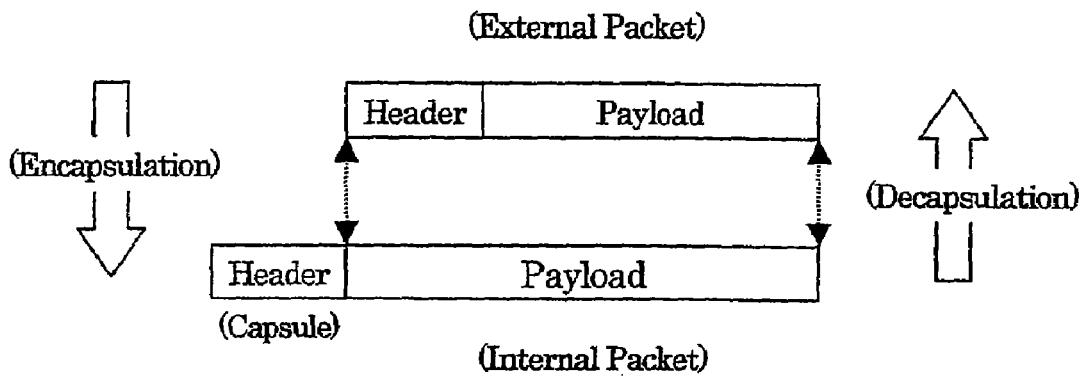
FIG. 2 is a diagram for explaining an encapsulation operation.
Figure 3:
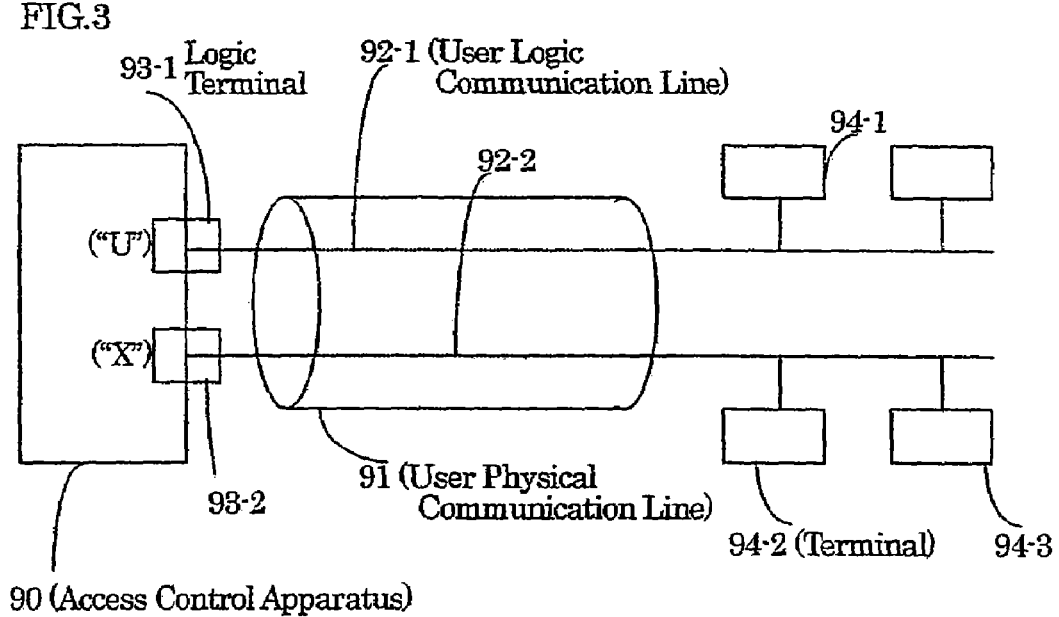
FIG. 3 is a diagram for describing a user communication line.
Figure 4:
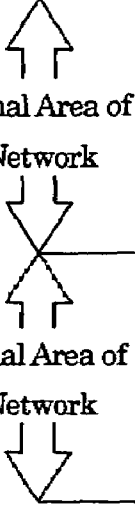
FIG. 4 is a diagram for indicating a section example of addresses used in the present invention.

On the other hand, as represented in FIG. 4, in an internal area of the integrated information communication system, a non-private address is directly positioned as an "address which is opened outside network", and is used in a non-private address communication. A private address range of the internal area of the integrated information communication system is employed as an address set inside a header of an internal packet functioning as an "address for encapsulation", and also employed as an address which is applied to either a server or a relay apparatus of a communication company as an "internal address of communication company". As explained above, an address of an internal area of the integrated information communication system is applied to a logic terminal of a termination of a user communication line. Although the first address application rule is practically available in such a case that a total utilization number of private addresses is small, when the total utilization number of these private addresses is large, there is short of the addresses for encapsulation.

Figure 5:
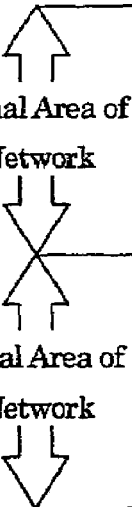
FIG. 5 is a diagram for indicating a section example of addresses used in the present invention.

Referring now to FIG. 5, a description will be made of a second application rule of IP addresses capable of compensating for the drawback of the first application rule. The second application rule corresponds to such a method for setting a portion of a private address range as a "use-prohibited address" range. As to the use-prohibited address range, a portion thereof is used as either an address for encapsulation, or an internal address of a communication company in the internal area of the integrated information communication system.

As an example of address applications based upon the second application rule, address ranges of "10.0.0.0" to "10.255.255.255", "172.16.0.0" to "172. 16.255.255" are used as the private address ranges. The use-prohibited address range is selected to be, for example, "192.168.0.0" to "192.168.255.255".

The third address application rule corresponds to such a rule made of changing a part of the second address application rule, and a use-prohibited address range is employed by being subdivided into an internal address of a communication company and an address commonly used between communication companies. It should be noted that both the first rule and the second rule are employed in an embodiment-1 (will be discussed later), and the third rule is employed in an embodiment-2 (will be discussed later). The remaining address range is used as a "non-private address range".

Further, at the access control apparatus, it is possible to set three items of source transmitting permission, source receiving permission and destination transmitting permission in the record of the conversion table. In accordance with the source transmitting permission, the control of permission or rejection regarding the transmission is carried out when the internal packet is transmitted to the network. In accordance with the source receiving permission, the control of permission or rejection regarding the receiving is carried out when the internal packet is received from the network, and in accordance with the destination transmitting permission, the control of permission or rejection regarding the transmission to the destination is carried out when the internal packet is designated.

In the present invention, the below-mentioned embodiments will be explained, in which an external IP packet is encapsulated so as to be converted into an internal packet. Alternatively, an external IP packet is simply encapsulated in order to be converted into an internal packet. Although the domain name server (DNS) may be applied to these embodiments, since this technique is known in the technical field (as previously described), an explanation of such an embodiment that the domain name server (DNS) is applied thereto is omitted in the following embodiments of the present invention.

1. Embodiment-1

Figure 6:
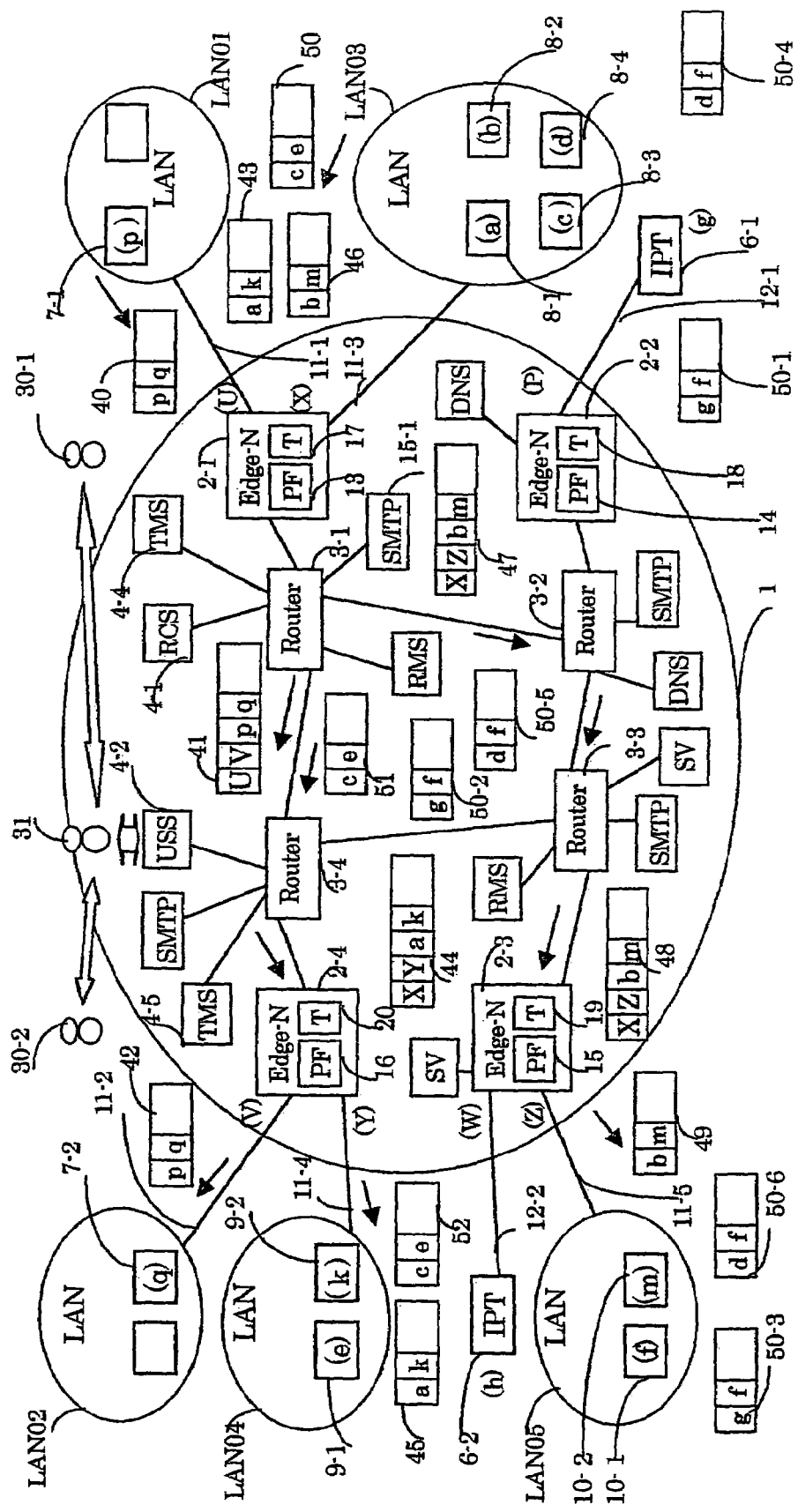
FIG. 6 is a block diagram for representing a structural example (embodiment-1) of the present invention.

Referring now to a FIG. 6, structural diagram of an integrated information communication system 1, an embodiment-1 will be described.

The integrated information communication system 1 internally contains access control apparatuses 2-1 to 2-4, and relay apparatuses 3-1 to 3-4. A LAN01 contains a terminal 7-1 whose IP address is "p"; a LAN02 contains a terminal 7-2 whose IP address is "q"; a LAN03 contains terminals 8-1 to 8-4 whose IP addresses are "a", "b", "c" and "d"; a LAN04 contains terminals 9-1 and 9-2, whose IP addresses are "e" and "k"; and also a LAN05 contains terminals 10-1 and 10-2 whose IP addresses are "f" and "m". An IP address of a terminal 6-1 corresponds to "g", and an IP address of a terminal 6-2 corresponds to "h".

It should be noted that an address which is used in an external area of the integrated information communication system 1 is called as an "external address"; an address which is used in an internal area thereof is referred to as an "internal address"; addresses of a source side (transmission side) of an IP packet are expressed as an "external source address" and an "internal source address", in correspondence with both the external area and the internal area of the integrated information communication system 1, respectively. Also, addresses of a destination side (reception side) of an IP packet are expressed as an "external destination address" and an "internal destination address", in correspondence with both the external area and the internal area of the integrated information communication system 1, respectively.

While an internal address "U" is applied to a logic terminal of a contact between a communication line 11-1 and the access control apparatus 2-1, another internal address "V" is applied to a logic terminal of a contact between a communication line 11-2 and the access control apparatus 2-4. While another internal address "X" is applied to a logic terminal of a contact between a communication line 11-3 and the access control apparatus 2-1, another internal address "Y" is applied to a logic terminal of a contact between a communication line 11-4 and the access control apparatus 2-4, and further, another internal address "Z" is applied to a logic terminal of a contact between a communication line 11-5 and the access control apparatus 2-3. Also, while a terminal 6-1 is connected via a communication line 12-1 to the access control apparatus 2-2, another internal address "P" is applied to a logic terminal of a termination of the communication line 12-1. While a terminal 6-2 is connected via the communication line 12-2 to the access control apparatus 2-3, another internal address "W" is applied to a logic terminal of a termination of the communication line 12-2.

The access control apparatus 2-1 contains both a packet filter 13 and a conversion table 17 (FIG. 7), whereas the access control apparatus 2-2 contains both a packet filter 14 and a conversion table 18 (FIG. 8). Also, the access control apparatus 2-3 contains both a packet filter 15 and a conversion table 19 (FIG. 9), whereas the access control apparatus 2-4 contains both a packet filter 16 and a conversion table 20 (FIG. 10). The internal addresses of the integrated information communication system 1 are applied to relay apparatus 3-1 to 3-4; a network representative server 4-1; a user service server 4-2; a resource management server 4-3; and table management servers 4-4 and 4-5, which further contain IP communication means. The IP communication means are directly connected via an IP communication line having an IP packet transfer function to each other, or are indirectly connected via the relay apparatus to each other. The IP communication means can exchange information by mutually transmitting/receiving the IP packets among these IP communication means.

Although the conversion tables 17 and 18 are the same record format, the conversion table 19 includes the source address mask and the destination address mask inside of the record and the conversion table 20 includes the source transmitting permission, the source receiving permission and the destination transmitting permission therein. The access control apparatuses 2-1 to 2-4 respectively hold the charge information file and it is possible to newly write and read the charge information by referring the charge identifier registered in the conversion table.

<<Preparation>>

Both a use-responsible person 30-1 of the LAN01 and another use-responsible person 30-2 of the LAN02 agree with such a fact that a virtual dedicated line (virtual exclusively-used line) is set via the integrated information communication system 1 between the LAN01 and the LAN02, and then request registration of an IP communication line to a service acceptance person 31 of the integrated information communication system 1. As a result, the service acceptance person 31 operates the user service server 4-2, and this user service server 4-2 exchanges information with the network representative server 4-1 and the resource management server 4-3 by employing the IP communication means. Furthermore, the user service server 4-2 requests both the table management servers 4-4 and 4-5 to set addresses and priority degrees in accordance with the below-mentioned sequential operation to the conversion table 17 employed in the access control apparatus 2-1 and also the conversion table 20 provided in the access control apparatus 2-4.

In other words, the table management server 4-4 sets (registers) "U" as an internal source address, "V" as an internal destination address, "3" as a request identification for implying a virtual dedicated line, "4" as a priority degree, and also sets "Fa01" as a charge identifier, respectively, into a first record of the conversion table 17 (namely, first column of conversion table) which is shown in FIG. 7 and is employed in the access control apparatus 2-1. Similarly, the table management server 4-5 sets (registers) "V" as an internal source address, "U" as an internal destination address, "3" as a request identification for implying a virtual dedicated line, "4" as a priority degree, and also sets "Fc01" as a charge identifier, respectively, into a first record of the conversion table 20 (namely, first column of conversion table) which is shown in FIG. 10 and is employed in the access control apparatus 2-4.

In accordance with a sequential operation similar to the above-explained sequential operation, the table management server 4-4 is requested from the user service server 4-2 by employing the IP communication means to set the following items. That is to say, the table management server 4-4 sets "X" as an internal source address, "a" as an external source address, "k" as an external destination address, "Y" as an internal destination address, "1" as a request identification which implies a private address communication, "2" as a priority degree, and also sets "Fa02" as a charge identifier, respectively, into a second record of the conversion table 17 employed in the access control apparatus 2-1. Further, the table management server 4-4 sets "X" as an internal source address, "b" as an external source address, "m" as an external destination address, "Z" as an internal destination address, "1" as a request identification which implies a private address communication, "2" as a priority degree, and also sets "Fa03" as a charge identifier, respectively, into a third record of the conversion table 17. Further, the table management server 4-4 sets "X" as an internal source address, "c" as an external source address, "2" as a request identification which implies a non-private address communication, "0" as a priority degree, and also sets "Fa04" as a charge identifier, respectively, into a fourth record of the conversion table 17. Moreover, the table management server 4-4 sets "X" as an internal source address, "d" as an external source address, "f" as an external destination address, "2" as a request identification which implies a non-private address communication, "0" as a priority degree, and also sets "Fa05" as a charge identifier, respectively, into a fifth record of the conversion table 17.

A user of a terminal 6-1 requests registration of the terminal 6-1 to the service acceptance person 31, and the table management server 4-4 is requested from the user service server 4-2 by employing the IP communication means. Then, the table management server 4-4 sets "P" as an internal source address, "f" as an external destination address, "2" as a request identification which implies a non-private address communication, "0" as a priority degree, and also sets "Fb01" as a charge identifier, respectively, into a first record of the conversion table 18 employed in the access control apparatus 2-2 shown in FIG. 8, without setting an external source address. Similarly, a user of a terminal 6-2 requests registration of the terminal 6-2 to the service acceptance person 31, and the table management server 4-5 is requested from the user service server 4-2 by employing the IP communication means. Then, the table management server 4-5 sets "W" as an internal source address, "h" as an external source address, "2" as a request identification which implies a non-private address communication, "0" as a priority degree, and also sets "Fd01" as a charge identifier, respectively, into a first record of the conversion table 19 employed in the access control apparatus 2-3 and shown in FIG. 9.

Furthermore, in response to a request made by use-responsible person of the LAN05, the table management server 4-5 sets "Z" as an internal source address, "mx" as an external source address, "MSK1" as a source address mask, "MKD1" as a destination address mask, "bx" as an external destination address, "X" as an internal destination address, "1" as a request identification, "2" as a priority order, and also sets "Fd02" as a charge identifier, respectively, into a second record of the conversion table 19. Also, the table management server 4-5 sets "Z" as an internal source address, "fx" as an external source address, "MSK2" as a source address mask, "2" as a request identification, "0" as a priority order, and also sets "Fd03" as a charge identifier, respectively, into a third record of the conversion table 19.

Similarly, in response to a request issued from a use-responsible person of the LAN04, the table management server 4-5 is requested from the user service server 4-2 by employing the IP communication means. The table management server 4-5 sets "Y" as an internal source address, "k" as an external source address, "a" as an external destination address, "YES" as a source transmitting permission, a source receiving permission and a destination transmitting permission, "X" as an internal destination address, "1" as a request identification, "2" as a priority order, and also sets "Fc02" as a charge identifier, respectively, into a second record of the conversion table 20. Also, the table management server 4-5 sets "Y" as an internal source address, "e" as an external source address, "2" as a request identification, "0" as a priority order, and also "Fc03" as a charge identifier, respectively, into a third record of the conversion table 20. The source transmitting permission and the destination transmitting permission set "NO" as another case.

<<Utilization of Virtual Dedicated Line>>

Figure 11:
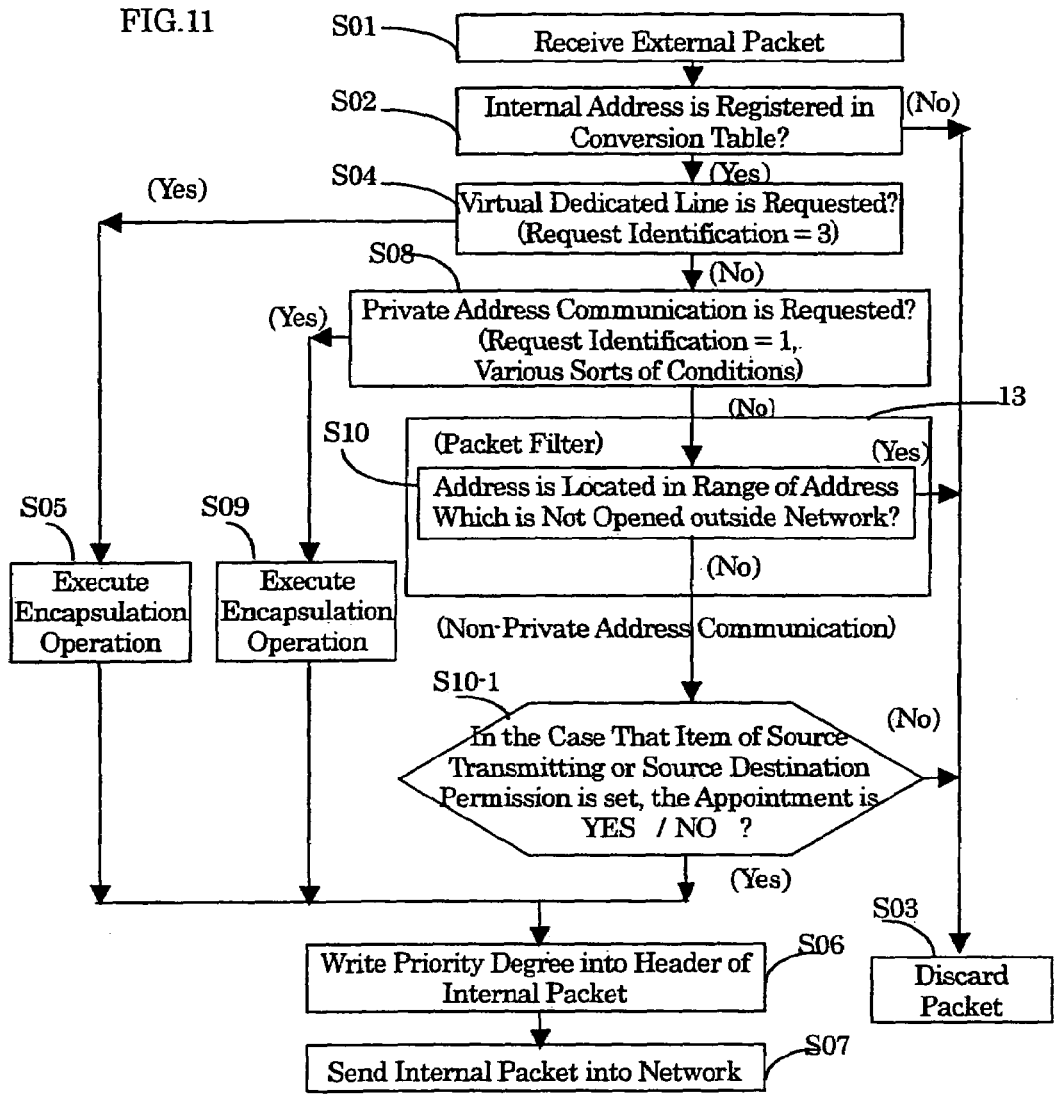
FIG. 11 is a flow chart for describing an operational example of an access control apparatus provided on the transmission side in the first embodiment, in which an external packet is received so as to produce an internal packet, and then, the internal packet is transmitted into an internal area of a network.
Figure 12:
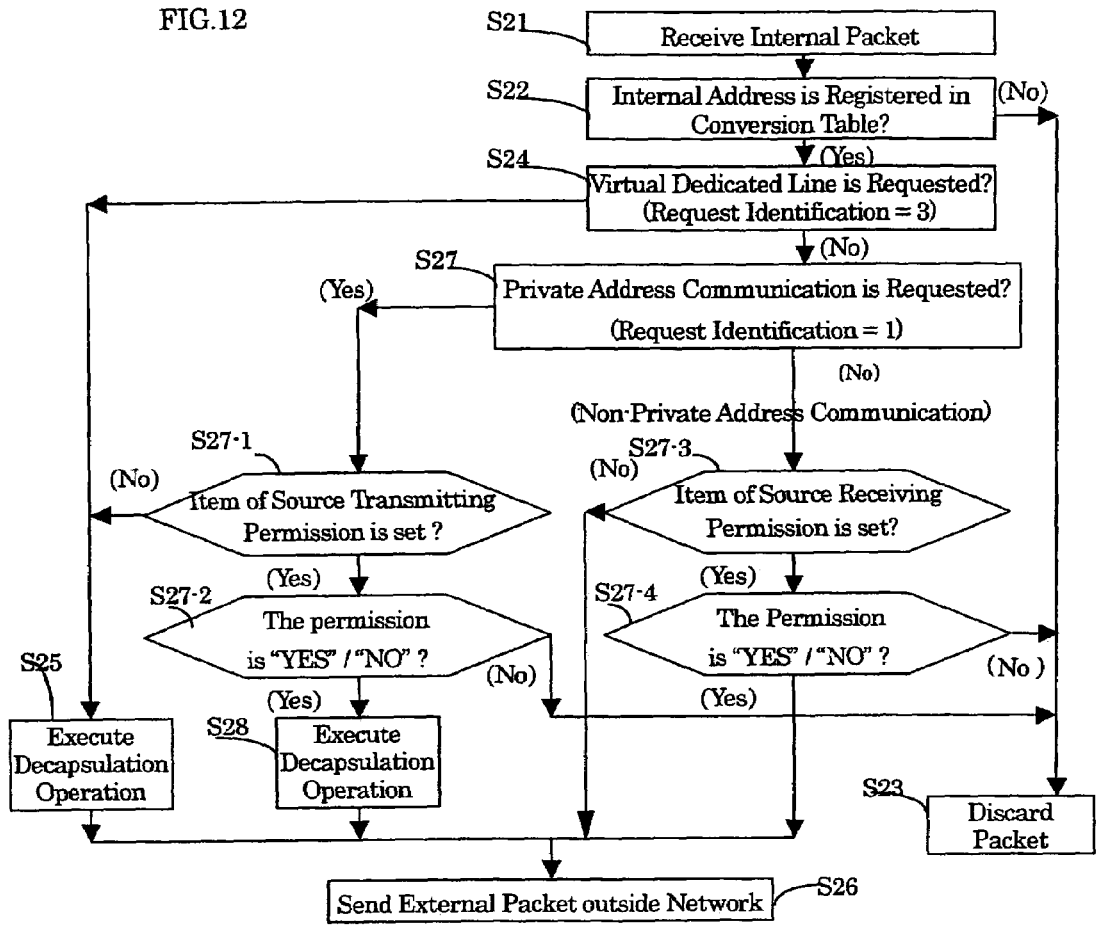
FIG. 12 is a flow chart for describing an operational example of an access control apparatus provided on the reception side in the first embodiment, in which an internal packet is received so as to recover an external packet, and then, the external packet is transmitted into the internal area of the network.

A flow operation of an IP packet transfer operation executed by using a virtual dedicated line will now be explained with reference to flow charts indicated in FIG. 11 and FIG. 12.

From the terminal 7-1 provided in the LAN01, an external packet 40 corresponding to both the external source address "p" and the external destination address "q" is sent out to the user communication line 11-1. Then, the access control apparatus 2-1 receives the external packet 40 (Step S01 of FIG. 11), and the external packet 40 is inputted from the logic terminal of the user communication line 11-1. The access control apparatus 2-1 retrieves a record of the conversion table 17, which contains the internal address "U" applied to the logic terminal (Step S02). When the record containing the internal address "U" is not yet registered in the conversion table 17, the access control apparatus 2-1 discards the external packet 40 (Step S03). In this case, since the record is registered in the conversion table 17, the access control apparatus 2-1 checks a value of a request identification of the first record of the conversion table 17 which is retrieved in the above step (Step 04). In this case, since the value of the request identification is equal to the value "3" which implies the virtual dedicated line, the access control apparatus 2-1 acquires the internal destination address "V" of the first record, and executes the capsulation operation by using both the internal source address "U" and the internal destination address "V", which are acquired in the above-explained steps, so as to produce an internal packet (Step S05). Next, the priority degree "4" of the first record is stored into a priority degree field (for example, TOS field defined in RFC791) of a header contained in the above-described produced internal packet (Step S06), and then the internal packet is transferred to the internal area of the network (Step S07). Into a field designated by the charge identifier "Fa01", charge information related to, for example, an accumulated number of internal packets produced by the access control apparatus 2-1, and also packet lengths are stored.

The above-produced internal packet 41 is reached via the relay apparatus 3-1 and 3-4 to the access control apparatus 2-4 in accordance with the packet transfer rule within the network. Both the relay apparatus 3-1 and the relay apparatus 3-4 contain relay tables, and determine a transfer destination of a packet. Next, when the access control apparatus 2-4 receives an internal packet 41 (Step S21 of FIG. 12), the access control apparatus 2-4 retrieves such a record that the internal destination address "V" contained in the internal packet 41 is contained as the internal source address of the conversion table 20 (Step S22). When the record is not present in the conversion table 20, the access control apparatus 2-4 discards the internal packet 41 (Step S23). In this case, since the internal source address of the first record of the conversion table 20 is equal to "V", the access control apparatus 2-4 checks a value of a request identification contained in the above-described detected first record (Step S24). In this case, since the value of the checked request identification corresponds to such a value "3" which implies the virtual dedicated line, the internal packet 42 is decapsulated so as to recover an external packet 42 (Step S25). Then, the recovered external packet is transmitted to the external area of the integrated information communication system (Step S26), and then, is reached via the user communication line 11-2 to the terminal 7-2 provided inside the LAN02.

It should be noted that the above-explained address range employed in the communication by the virtual dedicated line is not limited to the first application rule, but also to the second application rule. Thus, an arbitrary address range may be available.

<<Private Address Communication>>

In the case that an external packet 43 is transmitted from such a terminal 8-1 whose external source address is "a" in the LAN03 to a terminal 9-2 whose external address is "k" in the LAN04, the access control apparatus 2-1 receives the external packet 43 (Step S01 of FIG. 11), and retrieves such a record of the conversion table 17, which contains the internal address "X" applied to the logic terminal of the user communication line 11-3 as an item of an internal source address (Step S02) in order to check as to whether or not the request identification is the virtual dedicated line (Step S04). In this case, since the internal address is registered as the second record of the conversion table 17, the access control apparatus 2-1 checks a value of request identification of the second record (Step S08). In this case, since the checked request identification corresponds to such a value "1" which implies the private address communication, a set of the internal address "X" applied to the above-explained inputted logic terminal, the external source address "a" contained in the header of the external packet, and the external destination address "k" thereof is made coincident with a set of the internal source address "X" contained in the second record of the conversion table 17, the external source address "a" thereof, and the external destination address "k" thereof. As a result, the access control apparatus 2-1 acquires the internal destination address "Y" of the second record, and encapsulates the external packet 43 by employing both the internal source address "X" and the internal destination address "Y" so as to produce an internal packet 44 (Step S09), and stores the priority degree "2" of the above-described second record into a priority degree field of a capsule (Step S06), and thereafter, transfers the produced internal packet 44 into the network (Step S07).

The above-produced internal packet 44 is reached via the relay apparatus 3-1 and 3-4 to the access control apparatus 2-4 in accordance with the IP packet rule within the network. Next, when the access control apparatus 2-4 receives an internal packet 44 (Step S21 of FIG. 12), the access control apparatus 2-4 retrieves such a record that the internal destination address "Y" contained in the internal packet 44 is contained as the internal source address of the conversion table 20 (Step S22). When the record is not present in the conversion table 20, the access control apparatus 2-4 discards the internal packet 44 (Step S23). In this case, since the internal source address of the second record of the conversion table 20 is equal to "Y", the access control apparatus 2-4 checks a value of a request identification contained in the above-described detected second record (Step S24). In this case, since the value of the checked request identification corresponds to such a value "1" which implies the private address communication (Step S27), the external destination address "k" in the internal packet coincides with an external source address "k" of the second record (Step S27-1), further since the source receiving permission is "YES" (Step S27-2), the internal packet 44 is decapsulated (Step S28) so as to recover an external packet 45. Then, the recovered external packet 45 is transmitted to the external area of the integrated information communication system (Step S26), and then, is reached via the user communication line 11-4 to the terminal 9-2 whose IP address is "k" in the LAN04. In a case that the source receiving permission is "NO", the packet is abandoned (Step S23). Further, in a case that there is no items of the receiving address permission in records of the conversion table, the check of the receiving address permission can be not carried out.

It should also be noted that the process operation defined at the above-explained Step S27 is also equal to such a case that the record having the external destination address "k" can be detected as the second record of the conversion table 20. If the record having the external destination address "k" cannot be detected as the second record of the conversion table 20, the above-explained received internal packet may be discarded at the above-explained Step S27.

Similarly, it is possible to establish a communication from the terminal 8-2 whose external source address is "b" within the LAN03 to the terminal 10-2 whose external destination address is "m" within the LAN05. In this case, both the third record of the conversion table 17 employed in the access control apparatus 2-1 and the second record of the conversion table 19 provided in the access control apparatus 2-3 are used. As a consequence, a reach destination of an external packet may be changed by changing an external destination address of an IP packet which is entered from the user communication line 11-3.

It is also possible to send the external packet from the terminal 10-2 of which external address is "m" to the terminal 8-2 of which external terminal is "b". It is checked that: The source address sent from the terminal 10-2 is "m" and the external packet being the destination address "b" is inputted from the logical terminal assigned the internal address "Z" of termination of the communication line 11-5. A result value of logical product (AND) of the destination address mask "MKD1" of the second record in the conversion table 19 and the destination address "b" coincides with the external destination address "bx" of the second record (the below equation (1)). Further, a result value of logical product (AND) of the source address mask "MKS1" of the second record in the conversion table 19 and the source address "m" coincides with the external source address "mx" of the second record (the below equation (2)). That is, it is checked whether or not the following equations (1) and (2) are established.

$$\text{"}MKD1\text{" \& "}b\text{"="}bx\text{"} \quad (1)$$

$$\text{"}MKS1\text{" \& "}m\text{"="}mx\text{"} \quad (2)$$

In this case, the above equations (1) and (2) are established and the external packet is encapsulated and becomes to the internal packet. The internal packet is transferred in the network, reaches the access control apparatus 2-1, then is decapsulated and the decapsulated packet is sent to the terminal 8-2.

<<Non-Private Address Communication>>

In the case that an external packet 50 is transmitted from such a terminal 8-3 whose external source address is "c" in the LAN03 to a terminal 9-1 whose external address is "e" in the LAN04, the access control apparatus 2-1 receives the external packet 50 (Step S01 of FIG. 11) via the logic terminal of the user communication line 11-3, and retrieves such a record of the conversion table 17, which contains the internal address "X" applied to the logic terminal into which the external packet 50 is inputted as an item of an internal source address (Step S02). When the relevant record is not registered in the conversion table 17, the access control apparatus 2-1 discards the external packet 50 (Step S03). In this case, since the internal address is registered as the fourth record of the conversion table 17, the access control apparatus 2-1 checks a value of a request identification of the fourth record (Steps S04 and S08). In this case, since the checked request identification corresponds to such a value "2" which implies the non-private address communication, the access control apparatus 2-1 checks as to whether or not the external source address of the external packet 50 is present in the range of the address which is not opened outside the network by employing the packet filter 13 (Step S10). When the external source address corresponds to the address which is not opened outside the network, the access control apparatus 2-1 discards the external packet 50 (Step S03). To the contrary, when the external source address corresponds to the address which is opened outside the network, the access control apparatus 2-1 directly uses the external packet 50 as an internal packet without executing the encapsulation, stores the priority degree "0" of the fourth record into the priority degree field of the capsule (Step S06), and then, transfers the internal packet inside the network (Step S07).

In this case, since there is no designation of the external destination address in the record, it is not necessary to check whether the external packet and the external destination address of the record are equal or not.

The above-produced internal packet 51 is transferred via the relay apparatus 3-1 and 3-4 to the access control apparatus 2-4 in accordance with the IP packet rule within the network. When the access control apparatus 2-4 receives the internal packet 51 (Step S21 of FIG. 12), the access control apparatus 2-4 checks an internal destination address contained in the internal packet 51. In this case, the access control apparatus 2-4 retrieves such a record of the conversion table 20, which contains the internal destination address "e" (Step S22). When the record containing the internal address "e" is not registered in the item of external source address of the conversion table 20, the access control apparatus 2-4 discards the internal packet 51 (Step S23). In this case, since such a record containing the internal address "e" is registered as a third record, the access control apparatus 2-4 checks s value of a request identification contained in the above-described third record (Steps S24 and S27). In this case, since the value of the checked request identification corresponds to such a value "2" which implies the non-private address communication, further since there is an item of the source receiving permission (Step 27-3), the internal packet 51 is not decapsulated, but the internal packet 51 directly becomes an external packet 52. Then, the external packet 52 is transmitted to the external unit of the integrated information communication system (Step S26), and then, is reached via the user communication line 11-4 to the terminal 9-1 provided inside the LAN02. The terminal 9-1 owns the IP address "e".

It is also possible to send the external packet from the terminal 8-4 of which external address is "d" to the terminal 10-1 of which external address is "f". When the external packet 50-4 inputs from the logical terminal of which internal address is "X" (Step S01), the access control apparatus 2-1 searches the fifth record of the conversion table 17 which all addresses of the external source address "d", the external destination address "f" and the internal source address "X" coincide (Steps S02, S04, S08, S10, S10-1 and S06). The external packet 50-4 is transferred in the network as the internal packet 50-5 (Step S07) and reaches the access control apparatus 2-3. That is, the external packet 50-4 reaches the terminal 10-1 as the external packet 50-6 via the communication line 11-5. When the above three addresses do not coincide, the inputted external packet is abandoned at the input access control apparatus (Step S03).

<<Variation of External Packet Transmission>>

It is also possible to send the external packet 50-1 from the terminal 6-1 of which external address is "g" to the terminal 10-1 of which external address is "f". When the external packet 50-1 inputs from the logical terminal of which internal address is "P" (Step S01), the access control apparatus 2-2 searches the first record of the conversion table 18 which a pair of addresses of the external destination address "f" and the internal source address "P" coincide (Steps S02, S04, S08, S10, S10-1 and S06). The external packet 50-1 is transferred in the network as the internal packet 50-2 (Step S07) and reaches the access control apparatus 2-3. Further, the external packet 50-1 reaches the terminal 10-1 as the external packet 50-3. When the above the pair address does not coincide, the inputted external packet is abandoned at the input access control apparatus (Step S03). The above sequence is a case that the external source address is not registered at the record.

<<Source Transmitting Permission and Destination Transmitting Permission>>

It is also possible to send the external packet from the terminal 9-2 of which external address is "k" to the terminal 8-1 of which external address is "a" via the communication line 11-4, the access control apparatus 2-4, inside of the network 1, the access control apparatus 2-1 and the communication line 11-4. The above external packet is converted into the internal packet at the access control apparatus 2-4. Since the value of the source transmitting permission of the second record in the conversion table 20 is "YES" and the value of the destination transmitting permission is "YES" (Step S10-1), the internal packet is transmitted to the network (Step S07). When any one of the source transmitting permission and the destination transmitting permission is "NO", the internal packet is not transmitted and is abandoned (Step S03).

Figure 13:
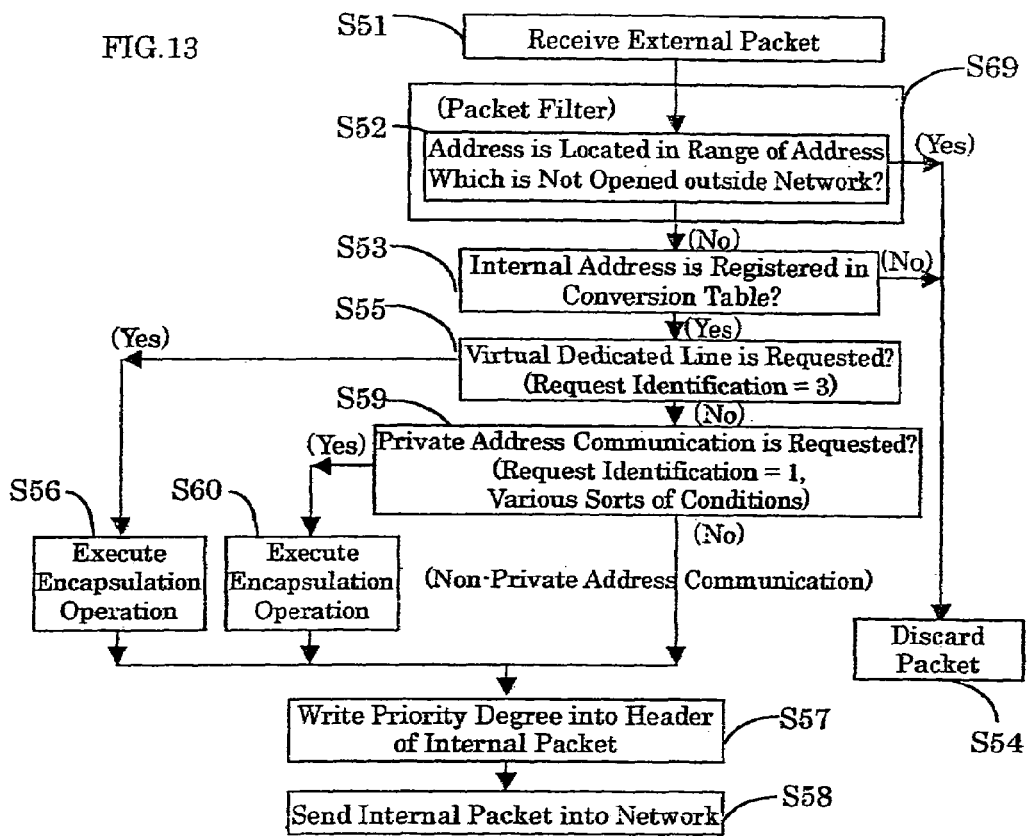
FIG. 13 is a flow chart for describing another operational example of the access control apparatus provided on the transmission side in the first embodiment, in which an external packet is received so as to produce an internal packet, and then, the internal packet is transmitted into an internal area of a network.

It is also possible to send the external packet from the terminal 9-1 of which external address is "e" to the terminal 8-1 of which external address is "a". The above external packet is converted into the internal packet at the access control apparatus 2-4. Since the value of the source transmitting permission of the third record in the conversion table 20 is "YES"(Step S10-1), the internal packet is transmitted to the network (Step S07). When the source transmitting permission is "NO", the internal packet is not transmitted and is abandoned (Step S06-2). The above sequence is a case that the external destination address is not registered at the record.

a. Position of Packet Filter:

In the above explanation, the function of the packet filter is performed in the sequential operation used to judge the non-private address communication. It should be noted that the function of the packet filter may be carried out at other positions in the encapsulation sequential operation. For instance, as indicated in FIG. 13, the function of the packet filter may be alternatively carried out just after a Step S51 (namely, reception of external packet). If the process step is located within a stage for converting an external packet into an internal packet, then the packet filter may be located at any positions.

b. Various Sorts of Servers:

The representative server 4-1 applies an instruction to the user service server 4-2, the resource management server 4-3, the table management servers 4-4 to 4-5 and the like. The instruction instructs commencements of operations of the respective servers. Otherwise, the representative server 4-1 causes these servers to issue individual reports such as operation conditions. The resource management server 4-3 may grasp operation conditions and failure information such as the relay apparatus 3-1 to 3-4, and the access control apparatus 2-1 to 2-4.

c. In the Case That Virtual Dedicated Line is Not Used:

In this embodiment, only both the private address communication and the non-private address communication may be carried out while the virtual dedicated line is not employed. To achieve these communications, the records whose request identifications imply the virtual dedicated lines are deleted from the conversion table 17 to 20. For example, both the first record of the conversion table 17 and the first record of the conversion table 20. Furthermore, the Step S04 (shown in FIG. 11) capable of judging as to whether or not the request identification corresponds to the virtual dedicated line is omitted. Also, the Step S24 (shown in FIG. 12) capable of judging as to whether or not the request identification corresponds to the virtual dedicated line is omitted.

d. Other Improving Methods of Information Security:

When each of the servers detects such a fact that a source address of an internal packet is located in a range of an address which is opened outside a network, this server may furthermore improve information security by refusing an information access by the internal packet. Also, even when a server provided in the internal area of the integrated information communication system is requested by an external packet to inform such an address which is not opened outside the network, the server is designed not to answer the request. As a result, the servers may prevent a secret address used inside the network from being leaked outside the network.

2. Embodiment-2

Referring now to FIG. 14 to FIG. 18, an integrated information communication system according to a second embodiment of the present invention will be described.

The integrated information communication system 57 of the second embodiment is arranged by a communication company management network 58 of a communication company A, a communication company management network 59 of a communication company B, and an IP communication line 60 used to connect a boundary relay apparatus 61 to another boundary relay apparatus 62. A packet filter 63 is provided in the boundary relay apparatus 61, and another packet filter 64 is employed in the boundary relay apparatus 62. There are further provided access control apparatus 65-1 to 65-7, relay apparatus 66-1 and 66-2, and also LANs 67-1 and 67-2.

Figure 14:
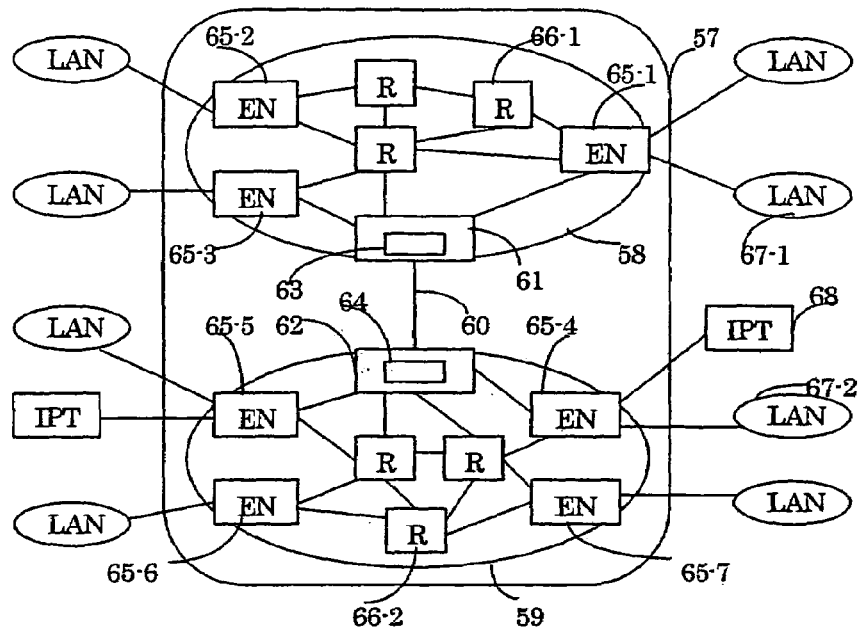
FIG. 14 is a block diagram for indicating a structure of a second embodiment of the present invention.
Figure 17:
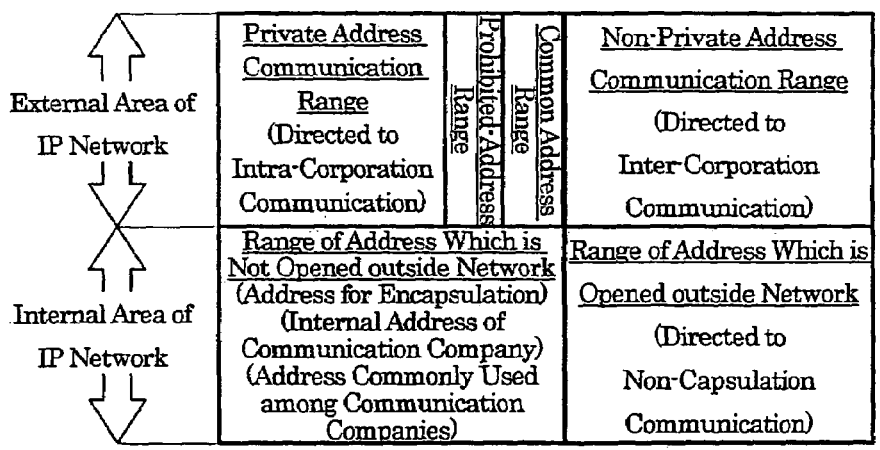
FIG. 17 is a diagram for indicating an example of an address section according to the second embodiment.

First, referring now to FIG. 17, a description is made of how to use an IP address. In this case, an address application rule corresponds to the above-described third rule. Within both the communication company management network 58 and also the communication company management network 59, a portion of a prohibited address range is applied to an address of an encapsulation, a portion thereof is applied to an internal address of a communication company, and the remaining thereof is applied to an address commonly used between the communication companies.

a. Internal Address of Communication Company:

Both the communication company A and the communication company B commonly use "240.0.0.0" to "240.255.255.255" as an internal address range of a communication company.

b. Communication Company-to-Communication Company Common Address:

Both the communication companies A and B commonly employ "241.0.0.0" to "241.255.255.255" as a communication company-to-communication company common address.

c. Address for Encapsulating External Address:

As an encapsulating address, both addresses of "242.0.0.0" to "255.255.255.255" and the private address range defined by IETF regulation are employed. That is, the private address range is defined by "10.0.0.0" to "10.255.255.255", "172.16.0.0" to "172.16.255.255", and "192.168.0.0" to "192.168.255.255".

d. Address Used in Non-Private Address Communication:

Such an addresses of an address range are employed, from which the above-described internal address of communication company, the communication company-to-communication company common address, and all of the encapsulation addresses are excluded. Within the IP communication line 60, an internal IP packet and such IP packets are transmitted/ received. These IP packets are transmitted/received between the communication companies.

e. Packet Filter of Boundary Relay Apparatus:

In FIG. 14, when both the packet filters 63 and 64 receive an IP packet from another communication company management network (Step S30 of FIG. 15), these packet filters 63/64 check a destination address of the received IP packet (Step S31). In such a case that the checked destination address is located within the internal address range of the communication company, namely corresponds to "240.0.0.0 to 240.255.255.255", these packet filters 63/64 discard this IP packet (Step S32). To the contrary, when the destination address is not located within the internal address range of the communication company, these packet filters 63/64 accept the IP packet (Step S33).

Also, in FIG. 14, when both the packet filter 63 and the packet filter 64 receive an IP packet transmission request issued from the communication company management network of the own communication company (Step S40 of FIG. 16), these packet filters 63/64 check a destination address of the IP packet transmission request (Step S41). In the case that the checked destination address is located within the communication company internal address range, namely, "240.0.0.0 to 240.255.255.255", the packet filters 63/64 discard the IP packet (Step S42). To the contrary, when the checked destination address is not located within the communication company address range, the packet filters 63/64 send out the IP packet to another communication company management network (Step S43).

f. Selection of Address Value:

The above-described address ranges are one of numeral examples. Alternatively, other address ranges may be selected, and/or an unallocated address range may be set. For instance, in the case that an address having a 32-bit length is employed, in an address section of FIG. 17, in an external area of an IP network, a private address communication range is selected to be "0.0.0.0" to "1.255.255.255"; a prohibited address range is selected to be "2.0.0.0" to "2.255.255.255"; a common address range is selected to be "3.0.0.0" to "3.255.255.255"; a non-private communication address range is selected to be "4.0.0.0" to "254.255.255.255"; and an unallocated address range is selected to be "255.0.0.0" to "255.255.255.255". Also, in an internal area of the IP network, a range of the address which is not opened outside the network is selected to be "0.0.0" to "3.255.255.255"; a range of the address which is opened outside the network is selected to be "4.0.0.0" to "254.255.255.255", and an unallocated address range is selected to be "255.0.0.0" to "255.255.255.255".

Figure 18:
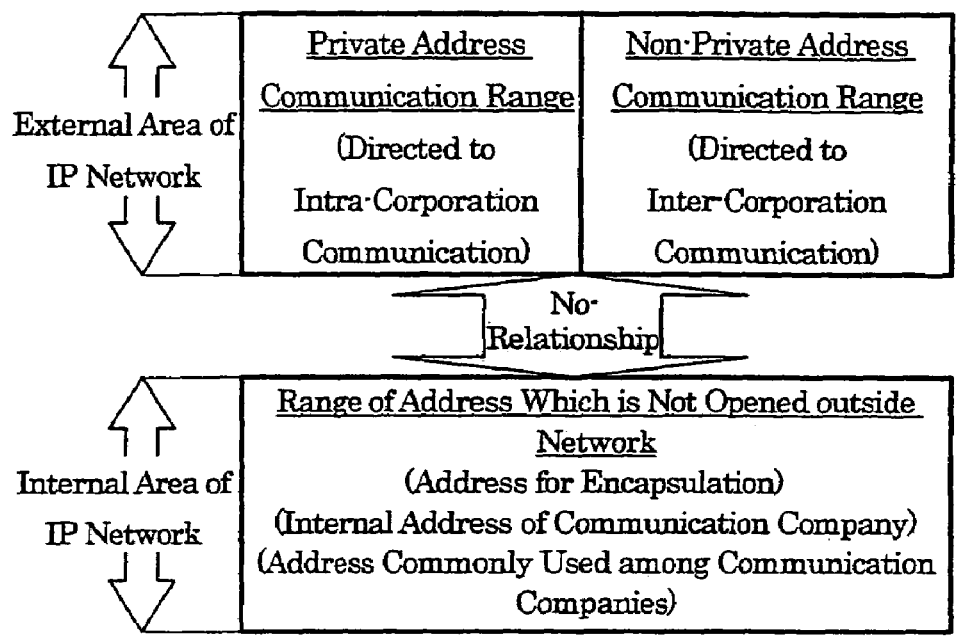
FIG. 18 is a diagram for indicating an example of an address section according to the second embodiment.

In this case, the unallocated address range may be employed in a packet transmission/reception experiment. Similarly, address ranges may be determined even in the case of an address having a 128-bit length defined in RFC 1883, and also even in the case of an address having another address length.

g. Case in Which 3 or More Operation Networks of Communication Company are Provided:

This second embodiment corresponds to such a case that two sets of the communication company management networks are employed. Even in such a case that three, or more communication company management networks are provided, while IP packets are transmitted/received among these communication companies, the communication company-to-communication company common address is used, and the internal address of communication company is employed inside the communication company management network. In such a case that an IP packet is transmitted/received between a communication company P and another communication company Q, a portion of data (payload) of the IP packet is converted into an encrypt document by applying an encrypt technique. The encrypt technique is determined by that the communication company P and the communication company Q individually can agree with the encrypt technique. Otherwise, while a digital signature technique is applied, both the data and the electronic signature related to the data may be stored in the payload of the IP packet.

h. Another Example of Non-Private Address Communication:

Even when such a method for encapsulating an external packet so as to produce an internal packet is employed in a non-private address communication, a packet filter of a boundary relay apparatus may be employed. In the embodiments other than the embodiment-15 of Japanese Patent No. 3084681 C2, as indicated in FIG. 18, an address section is made as follows: In an external area of an IP network, the addresses are subdivided into both the private address communication and the non-private address communication, whereas in an internal area of the IP network, these addresses are divided into the range of the address which is not opened outside the network. It should also be noted that the addresses used in the external area of the IP network, and the addresses used in the internal area of the IP network are determined without establishing any relationships.

Figure 15:
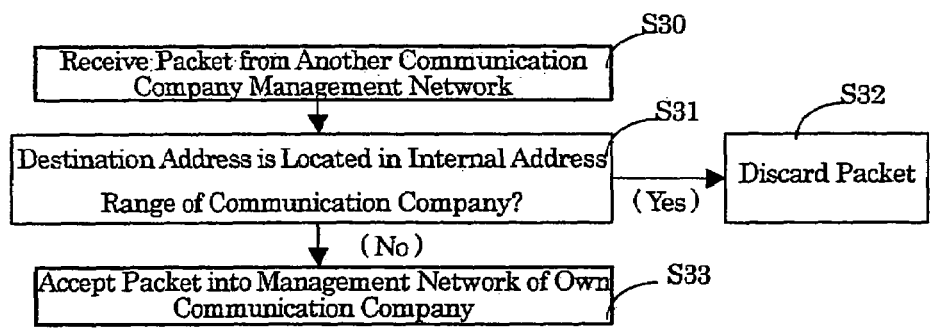
FIG. 15 is a diagram for explaining a function of an address filter employed in a boundary relay apparatus in the second embodiment.
Figure 16:
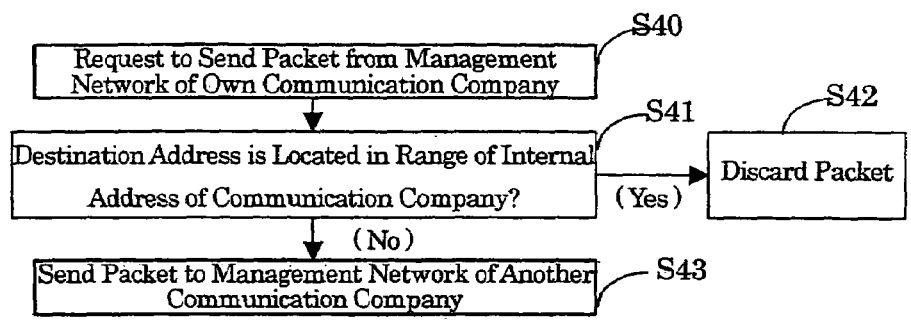
FIG. 16 is a diagram for explaining a function of an address filter employed in a boundary relay apparatus in the second embodiment.

As represented in FIG. 15 and FIG. 16, in a relay apparatus capable of connecting one communication company management network to another communication company management network by a communication line, such a packet filter may function by which an internal address of a communication company is detected to be discarded.

3. Embodiment-3

In both the embodiment-1 and the embodiment-2, when the internal packet implies the private address communication (namely, intra-corporation communication), namely when the value of the request identification is equal to "1", the header of the internal packet contains both the internal destination address and the internal source address. In this embodiment-3, although a header of an internal packet contains an internal destination address, such a simple header which does not contain an internal source address is applied. In other words, a description will now be made of another embodiment method to which both a simple encapsulation technique and a simple decapsulation technique are applied. It should be noted that the internal servers which are explained in both the embodiment-1 and the embodiment-2 own similar functions as explained above, and descriptions thereof are omitted.

Figure 19:
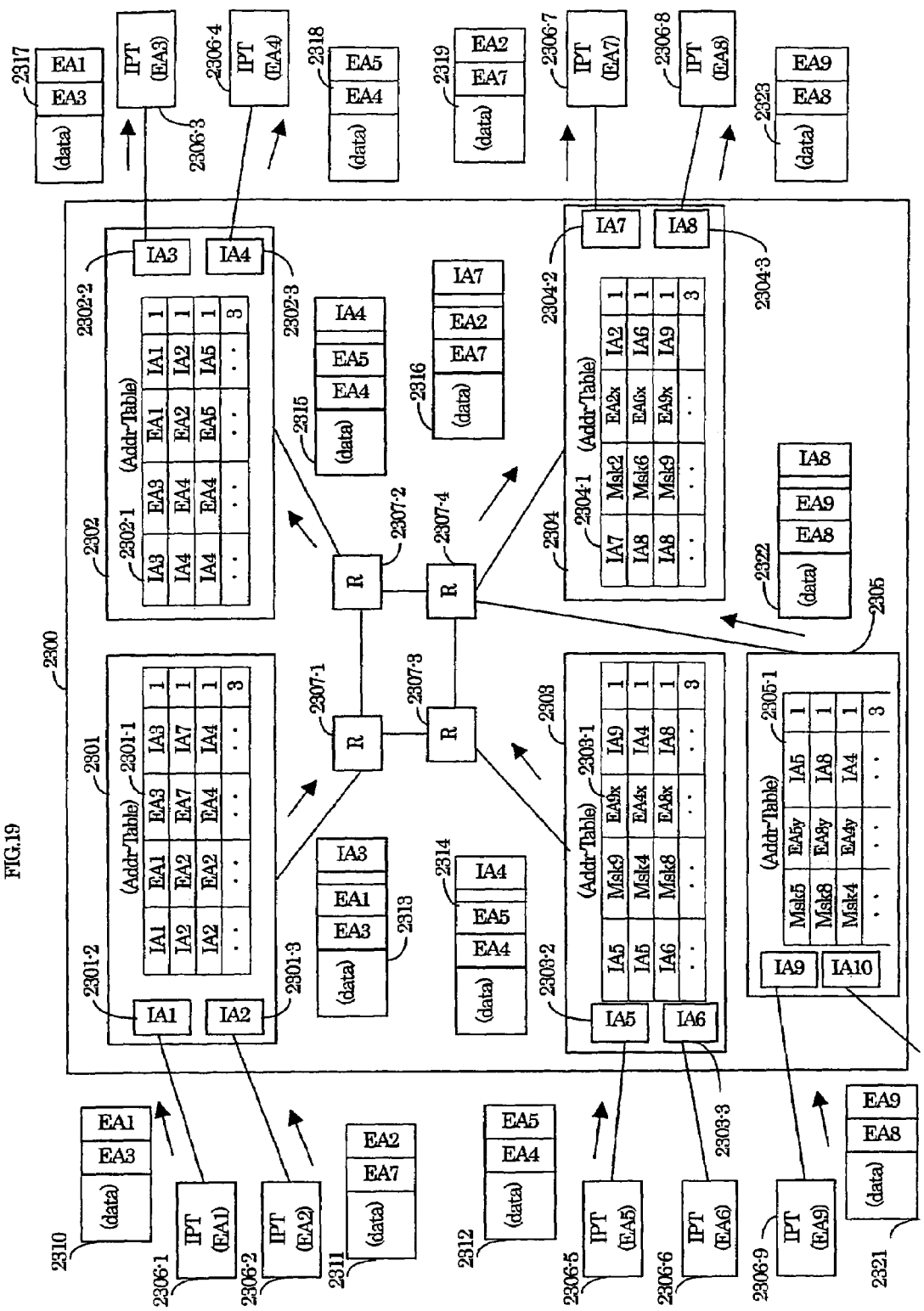
FIG. 19 is a diagram for explaining a function of an integrated information communication system according to a third embodiment.

In FIG. 19, a block 2300 indicates an integrated information communication system having an IP packet transfer function; blocks 2301 to 2305 show access control apparatus; blocks 2301-1, 2302-1, 2303-1, 2304-1 and 2305-1 represent conversion tables; blocks 2301-2, 2301-3, 2302-2, 2302-3, 2303-2, 2303-3, 2304-2 and 2304-3 show contacts (logic terminals) between termination units of communication lines and access control apparatus, to which internal addresses "IA1", "IA2", "IA3", "IA4", "IA5", "IA6", "IA7" and "IA8" are applied, respectively. Blocks 2306-1 to 2306-9 indicate IP terminals having functions capable of transmitting/receiving IP packets, and also having external IP addresses "EA1" to "EA9", respectively. Blocks 2307-1 to 2307-4 show routers (relay apparatus). The above-explained access control apparatus and routers are directly connected via the communication lines to each other, or are indirectly connected via the routers to each other, whereas the above-explained terminals are connected via the communication lines to the access control apparatus.

While the terminal 2306-1 transmits such an IP packet 2310 whose external source address is "EA1" and whose external destination address is "EA3", when the access control apparatus 2301 receives the IP packet 2310, the access control apparatus 2301 confirms such a fact that the internal address is equal to "IA1", and the external destination IP address of the IP packet 2310 is equal to "EA3". The internal address is applied to the logic terminal 2301-2 of the communication line termination into which the IP packet 2310 is inputted. Then, the access control apparatus 2301 retrieves the content of the conversion table 2301-1, and also retrieves such a record that the internal source IP address is equal to "IA1" in the beginning, and the external destination IP address "EA3" is next contained. Furthermore, the access control apparatus 2301 checks as to whether or not the external source. IP address "EA1" included in the IP packet 2310 is contained in the detected record.

In this example, records of a first column of the conversion table 2301-1 are provided as "IA1, EA1, EA3, IA3, 1" from a top thereof. Symbol "IA1" shows an internal source address, symbol "EA1" indicates an external source address, symbol "EA3" represents an external destination address, symbol "IA3" indicates an internal destination address, and reference numeral "1" shows a request identification.

While using the address of "IA3" contained in the record, a simple header is applied to the IP packet 2310 so as to form an internal packet 2313 (namely, simple encapsulation method). It should be noted that the simple header does not contain the internal source address "IA1". The produced internal packet 2313 is reached via the routers 2307-1 and 2307-2 to the access control apparatus 2302 containing the internal destination address "IA3" included in the internal packet. The access control apparatus 2302 removes the simple header of the received internal packet 2313 (namely, simple decapsulation method), sends out the previously acquired external IP packet 2317 (having the same content of IP packet 2310) to a communication line. Then, the IP terminal 2306-3 receives the IP packet 2317. The records "IA3, EA3, EA1, IA1, 1" of the first column of the conversion table 2302-1 are employed so as to transfer the IP packet along a direction opposite to the above-explained direction by way of the similar method. In other words, these records are used in order to transfer the IP packet from the terminal 2306-3 to the terminal 2306-1. Furthermore, in such a case that the access control apparatus 2302 confirms such a fact that a record containing a set of both the source address "EA1" and the destination address "EA3" contained in the IP packet within the received internal packet 2313 is not present in the conversion table 2302-1, the access control apparatus may discard the internal packet 2313.

When the simple encapsulation operation is carried out in the access control apparatus 2301, the check as to whether or not the external source address "EA1" contained in the IP packet 2310 is involved in the record detected within the conversion table 2301-1 may be omitted. In this check omission case, the respective records of the conversion table 2301-1 may not contain the external source IP address. Furthermore, with respect to the two external IP addresses (both external source IP address and external destination IP address) contained in each of the records of the conversion table 2301-1, such a simple encapsulation technical method established based upon a basic idea similar to an address mask technical method (will be discussed later) may be applied.

<<Application of Address Mask Technical Method>>

A description will now be made of another example in which an IP packet is transferred. While the terminal 2306-5 transmits such an IP packet 2312 whose external source address is "EA5" and whose external destination address is "EA4", when the access control apparatus 2303 receives the IP packet 2312, the access control apparatus 2303 confirms such a fact that the internal address is equal to "IA5", and the external destination IP address of the IP packet 2312 is equal to "EA4". The internal address is applied to the logic terminal 2303-2 of the communication line termination into which the IP packet 2312 is inputted. Then, the access control apparatus 2303 retrieves the content of the conversion table 2303-1, and also retrieves such a record that the internal source IP address is equal to "IA5" in the beginning.

In this case, records "IA5, Msk9, EA9x, IA9, 1" of a first column of the conversion table 2303-1, located from a top thereof, and records "IA5, Msk4, EA4x, IA4, 1" of a second column thereof are relevant. With respect to the records of the first column, the access control apparatus 2303 checks as to whether or not an AND-gating result between the mask "Msk9" and the external destination IP address "EA4" contained in the external IP packet 2312 is made coincident with the external destination IP address "EA9x" contained in the records of the first column (defined in following formula (3)). In this case, no coincidence between them is made. Next, with respect to the records of the second column, the access control apparatus 2303 checks as to whether or not an AND-gating result between the mask "Msk4" and the external destination IP address "EA4" contained in the external IP packet 2312 is made coincident with the external destination IP address "EA4x" contained in the records of the second column (defined in following formula (4)). In this case, a coincidence between them is made.

$$\text{If (``}Msk9\text{'' and ``}EA4\text{''}=\text{``}EA9x\text{'')} \tag{3}$$

$$\text{If (``}Msk4\text{'' and ``}EA4\text{''}=\text{``}EA4x\text{'')} \tag{4}$$

In this example, the records of the second column of the conversion table 2303-1, located from the top, are given as "IA5, Msk4, EA4x, IA4, 1". While using the address of "IA4" contained in this record, a simple header is applied to the IP packet 2312 so as to form an internal packet 2314 (namely, simple encapsulation method). It should be noted that the simple header does not contain the internal source address "IA5". The produced internal packet 2314 is reached via the routers 2307-3, 2307-4 and 2307-2 to the access control apparatus 2302 containing the internal destination address "IA4" included in the internal packet. The access control apparatus 2302 removes the simple header of the received internal packet 2314 (namely, simple decapsulation method), sends out the resulting external IP packet 2318 (having the same content of IP packet 2312) to a communication line. Then, the IP terminal 2306-4 receives the IP packet 2318.

In the access control apparatus 2301-1, the external IP packet 2311 which is transmitted from the terminal 2306-2 to the terminal 2306-7 is simple-encapsulated in a manner to the above-explained process manner so as to be converted into an internal packet 2316, while using the records "IA2, EA2, EA7, IA7, 1" of the second column of the conversion table 2301-1. The internal packet 2316 is reached via the routers 2307-1, 2307-2, 2307-4 to the access control apparatus 2304 containing the internal destination address "IA7" contained in the internal packet. The access control apparatus 2304 removes the simple header of the received internal packet 2316 (namely, simple decapsulation method), and sends out the previously acquired external IP packet 2319 (having the same content as IP packet 2311) to a communication line. Then, the IP terminal 2306-7 receives the external IP packet 2319.

Next, in the access control apparatus 2305, the IP packet 2321 which is transmitted from the terminal 2306-9 to the terminal 2306-8 is simple-encapsulated in a manner to the above-explained process manner so as to be converted into an internal packet 2322, while using the records "Msk8, EA8y, IA8, 1" of the second column of the conversion table 2305-1. The internal packet 2322 is reached via the routers 2307-4 to the access control apparatus 2304 containing the internal destination address "IA8" contained in the internal packet. The access control apparatus 2304 removes the simple header of the received internal packet 2322 (namely, simple decapsulation method), and sends out the previously acquired external IP packet 2323 (having the same content as IP packet 2321) to a communication line. Then, the IP terminal 2306-8 receives the external IP packet 2323.

Figures 20, 21:
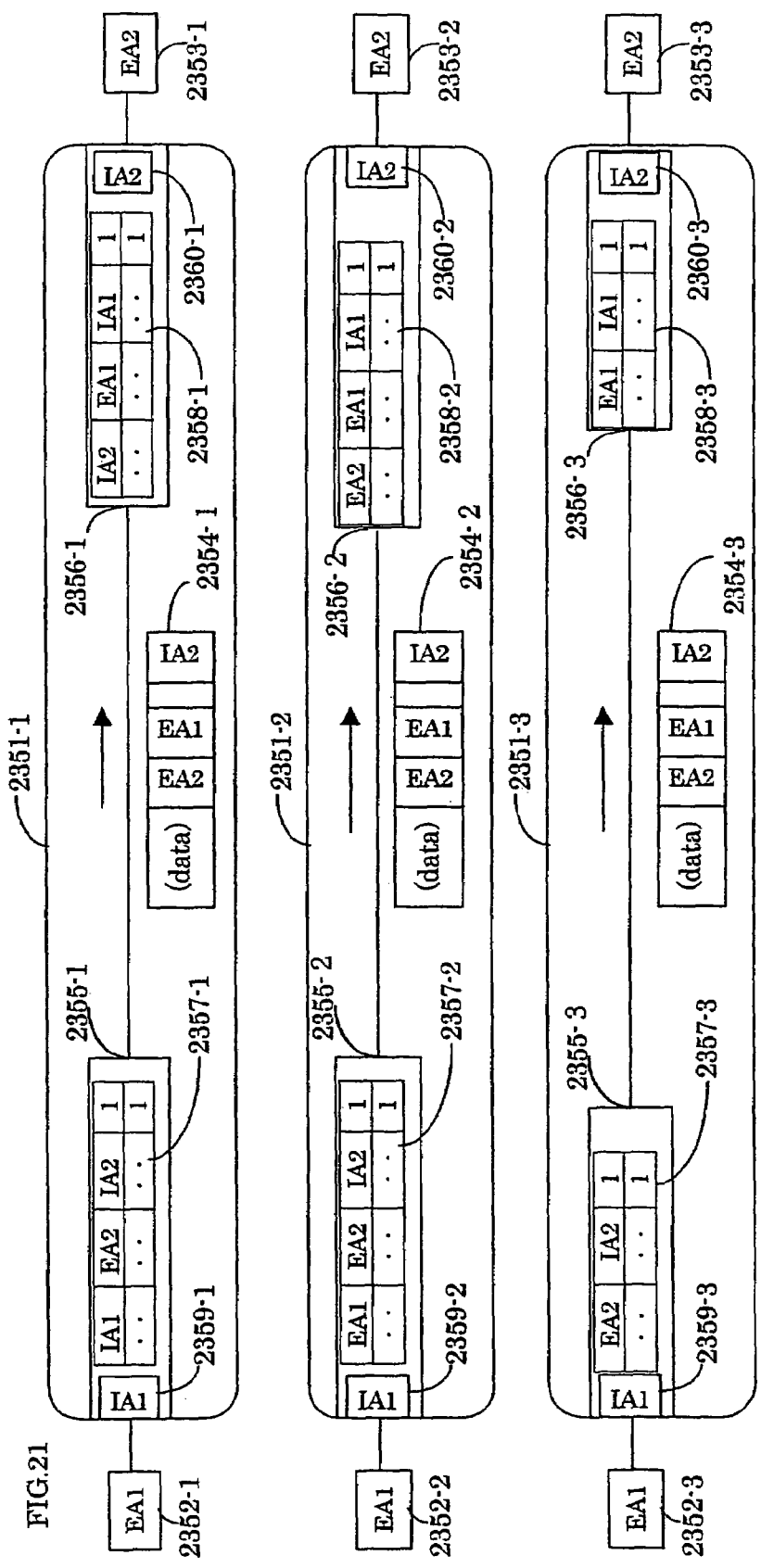
FIG. 20 is a diagram for representing a format of an internal packet employed in the third embodiment to a fifth embodiment.
FIG. 21 is a diagram for showing a function of a conversion table and a transfer operation of an internal packet in the third embodiment.

FIG. 20 represents a format of an internal packet (also, will be called as internal frame) which is formed in the above-explained simple-encapsulation method. The above-explained internal packet owns such a format that a simple header is applied to an external IP packet, and the simple header contains both a destination address and an information area. It should be understood that the simple header does not contain an internal source address. The information area contains information (protocol and the like) related to a payload area of the internal packet.

Next, another embodiment as to both the simple-encapsulation method and the simple-decapsulation method will now be explained with reference to FIG. 21 and FIG. 22.

In these drawings, reference numerals 2351-1 to 2351-7 show integrated information communication systems, reference numerals 2352-1 to 2352-7 indicate terminals each having the external IP address "EA1", and reference numerals 2353-1 to 2353-7 represent terminals each having the external IP address "EA2". Also, reference numerals 2354-1 to 2354-7 show internal packets (internal frames). Reference numerals 2355-1 to 2355-7, and 2356-1 to 2356-7 represent access control apparatus. Also, reference numerals 2359-1 to 2359-7 show contacts (logic terminals) between communication lines and access control apparatus, and internal addresses "IA1" are applied to these contacts. Reference numerals 2360-1 to 2360-7 show contacts (logic terminals) between communication lines and access control apparatus, to which internal addresses "IA2" are applied. Further, reference numerals 2357-1 to 2357-7 and 2358-1 to 2358-7 represent conversion tables. The above-explained terminals are connected to the access control apparatus via communication lines, and one access control apparatus is connected to another access control apparatus via a communication line. IP packets are transmitted/received between the terminals and the access control apparatus, and the internal packets (internal frames) are transferred between the access control apparatus. It should be noted that a relay apparatus (router and the like) may be installed in a communication line connected between one access control apparatus and another access control apparatus. The relay apparatus is used to determine a path of an internal packet transfer destination.

While the terminal 2352-1 transmits such an external IP packet whose external source address is "EA1" and whose external destination address is "EA2", when the access control apparatus 2355-1 receives the external IP packet, the access control apparatus 2355-1 confirms such a fact that the internal address is equal to "IA1", and the external destination IP address of the IP packet is equal to "EA2". The internal address is applied to the logic terminal 2359-1 of the communication line termination into which the IP external packet is inputted. Then, the access control apparatus 2355-1 retrieves the content of the conversion table 2357-1, and also retrieves such a record that the internal source IP address is equal to "IA1" in the beginning, and the external destination IP address "EA2" is next contained. In this example, records of a first column of the destination conversion table 2357-1, located from a top thereof, are given as "IA1, EA2, IA2, 1". While using the address of "IA2" contained in this record, a simple header is applied to the IP packet so as to form an internal packet 2354-1 (namely, simple encapsulation method). It should be noted that "1" of the record is a request identification. The produced internal packet 2354-1 is reached via the communication line to the access control apparatus 2356-1 containing the internal destination address "IA2" included in the internal packet. The access control apparatus 2356-1 removes the simple header of the received internal packet 2354-1 (namely, simple decapsulation method), sends out the previously acquired external IP packet to a communication line. Then, the IP terminal 2353-1 receives the recovered external IP packet.

While the terminal 2352-2 transmits such an IP packet whose external source address is "EA1" and whose external destination address is "EA2", when the access control apparatus 2355-2 receives the IP packet, the access control apparatus 2355-2 confirms such a fact that the external source IP address of the IP packet is equal to "EA1", and the external destination IP address of the IP packet is equal to "EA2", irrespective of the internal address applied to the logic terminal 2359-2 of the communication line termination into which the IP packet is inputted. Then, the access control apparatus 2355-2 retrieves the content of the conversion table 2357-2. In this example, records of a first column of the conversion table 2357-2 are provided as "EA1, EA2, IA2, 1" from a top thereof. While using the address of "IA2" contained in the record, a simple header is applied to the IP packet so as to form an internal packet 2354-2 (namely, simple encapsulation method). The produced internal packet 2354-2 is reached via the communication lines to the network node apparatus 2356-2 containing the internal destination address "IA2" included in the internal packet. The access control apparatus 2356-2 removes the simple header of the received internal packet 2354-2 (namely, simple decapsulation method), sends out the previously acquired external IP packet to a communication line. Then, the IP terminal 2353-2 receives the recovered IP packet.

While the terminal 2352-3 transmits such an external IP packet whose external source address is "EA1" and whose external destination address is "EA2", when the access control apparatus 2355-3 receives the external IP packet, the access control apparatus 2355-3 confirms such a fact that the external destination IP address of the IP packet is equal to "EA2", irrespective of internal address applied to the logic terminal 2359-3 of the communication line termination into which the IP packet is inputted. Then, the access control apparatus 2357-3 retrieves the content of the conversion table 2357-3, and next retrieves such a record that the external destination IP address "EA2" is contained. In this example, records of a first column of the destination conversion table 2357-3, located from a top thereof, are given as "EA2, IA2, 1". While using the address of "IA2" contained in the record, a simple header is applied to the IP packet so as to form an internal packet 2354-3 (namely, simple encapsulation method). The produced internal packet 2354-3 is reached via the communication line to the access control apparatus 2356-3 containing the internal destination address "IA2" included in the internal packet. The access control apparatus 2356-1 removes the simple header of the received internal packet 2354-3 (namely, simple decapsulation method), sends out the previously acquired external IP packet to a communication line. Then, the IP terminal 2353-3 receives the IP packet.

While the terminal 2352-4 transmits such an IP packet whose transmission source external address is "EA1" and whose destination external address is "EA2", when the access control apparatus 2355-4 receives the IP packet, the access control apparatus 2355-4 confirms such a fact that the internal address is equal to "IA1", and the external destination IP address of the IP packet is equal to "EA2". The internal address is applied to the logic terminal 2359-4 of the communication line termination into which the IP packet is inputted. Then, the access control apparatus 2352-4 retrieves the content of the conversion table 2355-4, and also retrieves such a record that the internal source IP address is equal to "IA1" in the beginning. In this case, records "IA1, Msk1, EA1x, Msk2, EA2x, IA2, 1" of a first column of the conversion table 2357-4, located from a top thereof, are equivalent thereto. First of all, with respect to the records of the first column, the access control apparatus 2355-4 checks as to whether or not an AND-gating result between the mask "Msk2" and the external destination IP address "EA2" contained in the inputted external IP packet is made coincident with the external destination IP address "EA2x" contained in the records of the first column (defined in following formula (5)).

Furthermore, the access control apparatus 2355-4 checks as to whether or not an AND-gating result between the external source mask "Msk1" and the external destination IP address "EA1" contained in the external IP packet is made coincident with the external destination IP address "EA1x" contained in the same record (defined in following formula (6)).

If ("$Msk2$" and "$EA2$"="$EA2x$") (5)

If ("$Msk1$" and "$EA1$"="$EA1x$") (6)

In this example, the records of the first column of the conversion table 2357-4, located from the top, are given. While using the address of "IA2" contained in this record, a simple header is applied to the external IP packet so as to form an internal packet 2354-4 (namely, simple encapsulation method). The produced internal packet 2354-4 is reached via the communication line to the access control apparatus 2356-4 containing the internal destination address "IA2" included in the internal packet. The access control apparatus 2356-4 removes the simple header of the received internal packet 2354-4 (namely, simple decapsulation method), sends out the resulting external IP packet to a communication line. Then, the IP terminal 2353-4 receives the IP packet 2318.

Such a case that the terminal 2352-5 transmits the external IP packet whose external source address is "EA1" and whose external destination address is "EA2" and then the access control apparatus 2355-5 receives the IP packet is similar to another case that the terminal 2352-4 transmits such an IP packet whose source address is "EA1" and whose destination address is "EA2". A different point of the second case is such that no AND-gating operation is carried out between the external destination IP mask and the external destination IP address contained in the above-described external IP packet, and other operations thereof are similar to those of the above-mentioned case.

Such a case that the terminal 2352-6 transmits the IP packet whose source address is "EA1" and whose external destination address is "EA2" and then the access control apparatus 2355-6 receives the IP packet is similar to another case that the terminal 2352-4 transmits such an IP packet whose source address is "EA1" and whose destination address is "EA2". A different point of the third-mentioned case is such that no confirmation is performed as to the internal address applied to the logic terminal 2359-6 of the communication line termination into which the IP packet is entered, and other operations thereof are similar to those of the above-mentioned case.

Also, such a case that the terminal 2352-7 transmits the external IP packet whose external source address is "EA1" and whose external destination address is "EA2" and then the access control apparatus 2355-7 receives the IP packet is similar to another case that the terminal 2352-5 transmits such an external IP packet whose external source address is "EA1" and whose external destination address is "EA2". A different point of the fourth-mentioned case is given as follows. That is, no confirmation is made as to the internal address which is applied to the logic terminal 2359-7 of the communication line termination into which the IP packet is entered, and other operations thereof are similar to those of the above-mentioned second case.

<<Brief Summary>>

In the above embodiment, the external packet which is reached via the communication line of the external area to the access control apparatus is processed under management of the conversion table employed in the access control apparatus in such a manner that a simple header is applied to the external packet so as to be converted into an internal packet. The simple header contains both a internal destination address and an information portion (note that internal source address is not contained). The internal packet is sent out from a network node, and then, is transferred via a relay apparatus into the integrated information communication system with reference to the internal address by the relay apparatus. Then, the internal packet is reached to another access control apparatus, by which the external packet is recovered from the reached internal packet. The recovered external packet is transferred to the communication line of the external area of the integrated information communication system. In this case, it is so designed that the external packet may be converted into the internal packet only when the three addresses set of the following addresses are registered as the record of the conversion table employed in the access control apparatus provided on the input side. The three addresses are the internal source address which is applied to the logic terminal of the communication line termination into which the external packet is entered; the external destination address contained in the inputted external packet; and also the external source address thereof.

As a variation example, it may be alternatively designed that the external packet may be converted into the internal packet only when the two addresses set of the following addresses are registered as the record of the conversion table employed in the access control apparatus provided on the input side. The two addresses are the internal source address which is applied to the logic terminal of the communication line termination into which the external packet is entered; and the external destination address contained in the inputted external packet.

Two or more records of the conversion table may be set. With respect to these internal addresses which are applied to the logic terminals of the communication line termination, the sets of the destination addresses are made different from each other with respect to the records. The transfer destination of the internal packet may be changed by changing the external destination address contained in the external packet which is entered from the same logic terminal. It is so designed that the external packet is converted into the internal packet only in such a case that the AND-gating operation result between the destination address of the inputted external packet and the destination address mask contained in the record within the conversion table can be made coincident with the destination address contained in the same record of the conversion table.

4. Embodiment-4 (Packet Reception Priority Control of Simple-Encapsulation Method)

In this fourth embodiment, the following priority degree controlling method is carried out. That is, while an internal packet (will also be referred to as an "internal frame") which is transferred within the integrated information communication system is reached to an access control apparatus, the internal packet is simple-decapsulated in the access control apparatus so as to obtain an external IP packet. This fourth embodiment is related to a method for controlling priority orders with respect to a sequence by which the resulting external IP packets are transmitted outside the integrated information communication system by employing a conversion table employed in the access control apparatus.

Both a source port number and a destination port number are defined in an inner portion of a TCP packet and also in an inner portion of a UDP packet, respectively, which are set in a payload of an IP packet. In this fourth embodiment, a source socket number=a source IP address || a source port number, and a destination socket number=a destination IP address || a destination port number will be called. It should be noted the symbol "||" indicates a coupling of data. An external IP packet corresponds to either IPv4 or IPv6.

<<Arrangement>>

Figure 23:
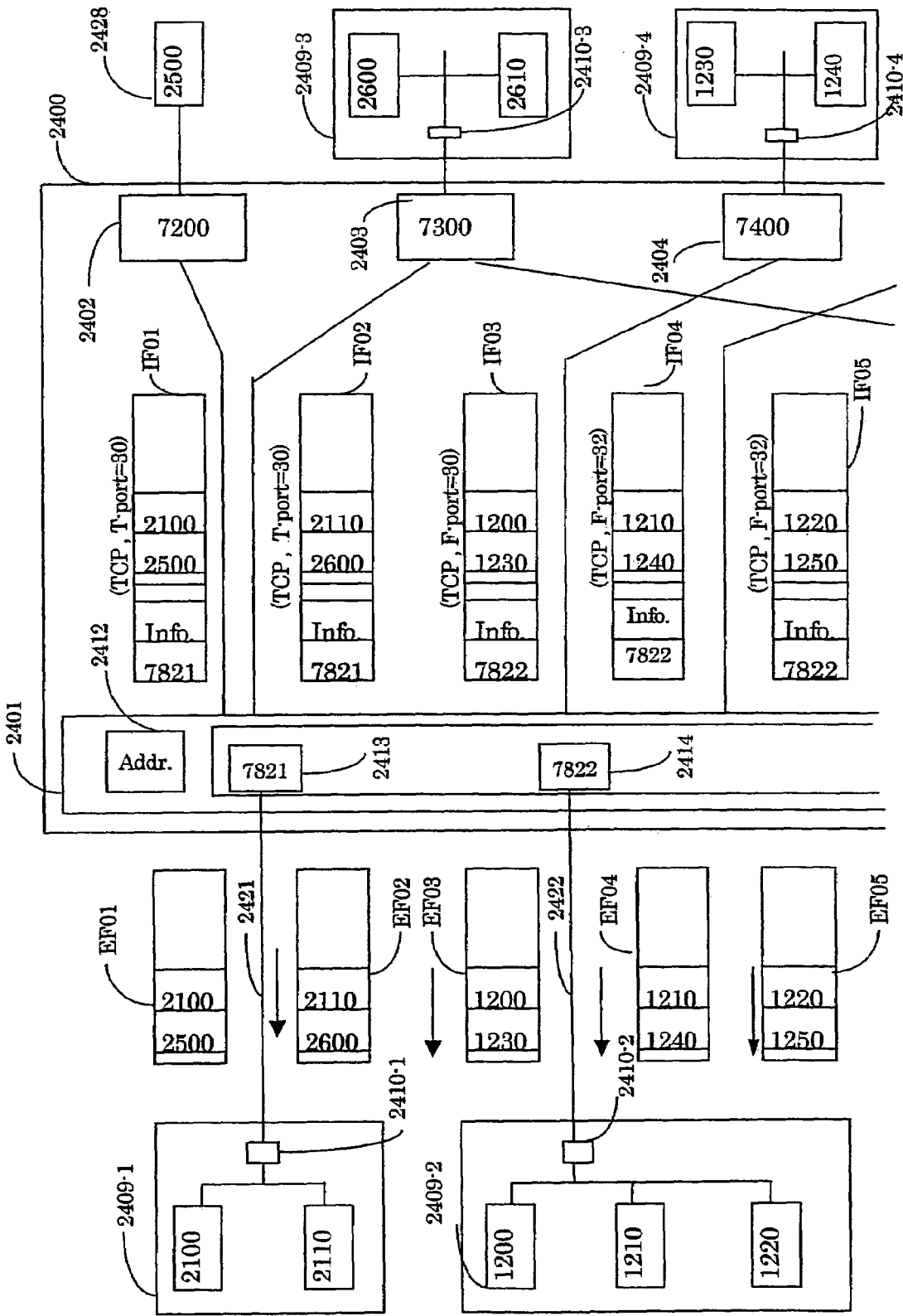
FIG. 23 is a diagram for explaining a function of an integrated information communication system according to a fourth embodiment.
Figure 24:
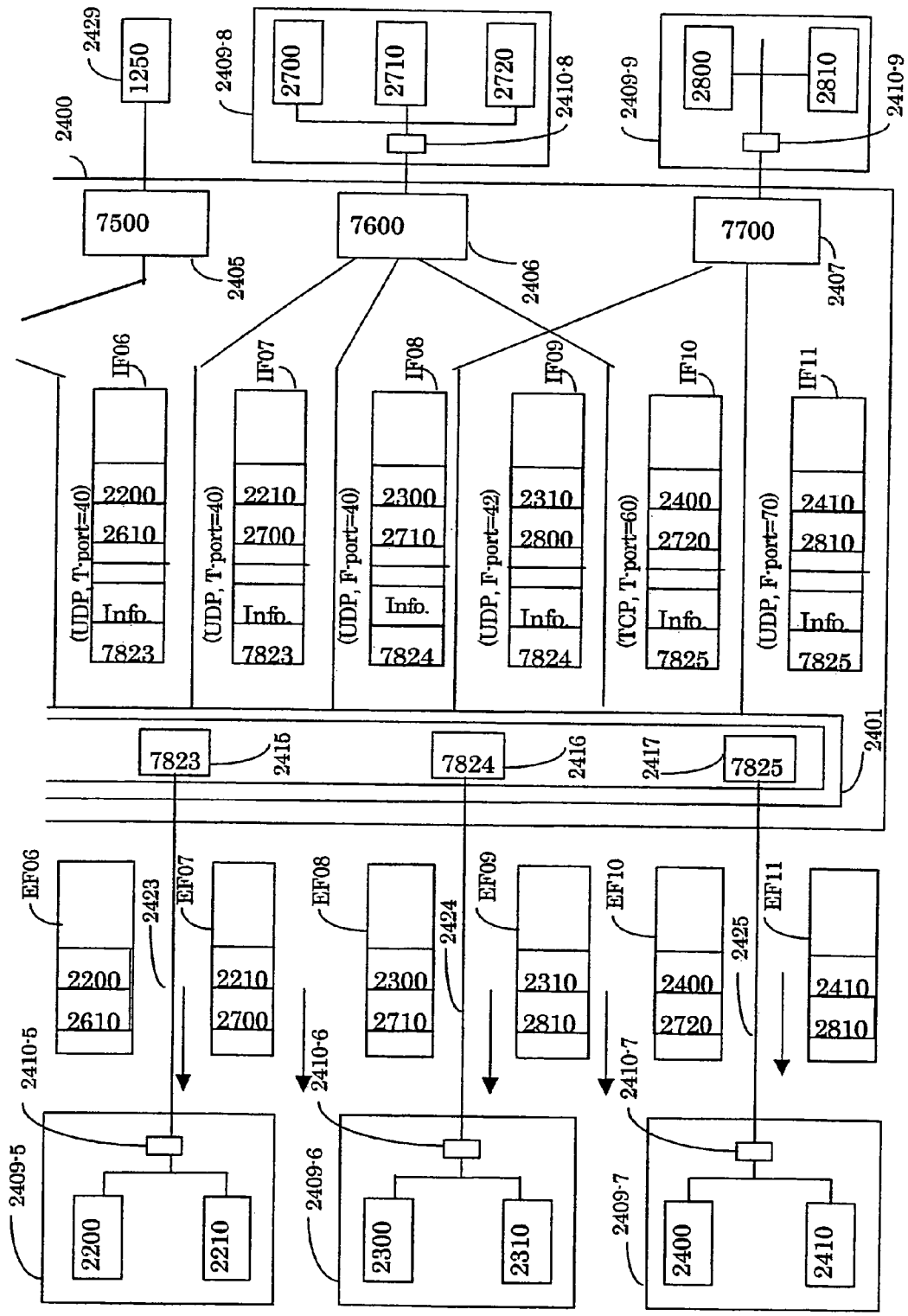
FIG. 24 is a diagram for describing another function of the integrated information communication system according to the fourth embodiment.

As indicated in FIG. 23 and FIG. 24, an integrated information communication system 2400 contains access control apparatus 2401 to 2407, and the access control apparatus 2401 contains a conversion table 2412. Reference numerals 2409-1 to 2409-9 each indicate a LAN. A terminal provided in a L AN is connected via inlet routers 2410-1 through 2410-9 and a communication line to any one of the access control apparatus employed in the integrated information communication system 2400. A terminal 2428 is connected via a communication line to the access control apparatus 2402, and another terminal 2429 is connected via another communication line to the access control apparatus 2405.

An internal packet may be performed by employing an HDLC(High-level Data Link Control) frame and an MPLS (Multiprotocol Label Switching) frame, and contains both a destination address and an information portion, as shown in FIG. 20. When an HDLC frame of an optical link line (WDM trunk line) is employed, a destination address is equal to such a destination address which is defined by the HDLC technical method. When the MPLS frame is employed, a destination address is equal to a label which is defined by the MPLS technical method. This "MPLS" is described in, for instance, the publication entitled by "Internet Draft Draft-ietf-mpls-label-encapsule-07" issued in September, 1999.

<<IP Address of Terminal>>

An IP address of a terminal employed in the LAN 2409-1 corresponds to "2100" and "2110"; an IP address of a terminal provided in the LAN 2409-2 corresponds to "1200", "1210", and "1220"; and also an IP address of a terminal contained in the LAN 2409-3 corresponds to "2600" and "2610". Further, an IP address of a terminal employed in the LAN 2409-4 corresponds to "1230" and "1240"; an IP address of a terminal provided in the LAN 2409-5 corresponds to "2200" and "2210"; and also an IP address of a terminal contained in the LAN 2409-6 corresponds to "2300" and "2310". Further, an IP address of a terminal employed in the LAN 2409-7 corresponds to "2400" and "2410"; an IP address of a terminal provided in the LAN 2409-8 corresponds to "2700", "2710", and "2720"; and also an IP address of a terminal contained in the LAN 2409-9 corresponds to "2800" and "2810". Further, an IP address of a terminal 2428 corresponds to "2500", and an IP address of a terminal 2429 corresponds to "1250". It should be understood that while an IP address corresponds to 32 bits (IPv4), or 128 bits (IPv6), this fourth embodiment corresponds to such an example that the IP address may be expressed by 4 digits of the decimal notation.

<<Conversion Table>>

Referring now to FIG. 25, a description will be made of a conversion table 2412 employed in the access control apparatus 2401. The conversion table 2412 is constructed of a main conversion table 2412-1, and sub-conversion tables 2412-2 to 2412-7. The main conversion table 2412-1 includes at least an item used to register a packet reception priority symbol in combination with the registration items of the conversion table as explained in another embodiment. In this embodiment, the main conversion table 2412-1 further contains items which are used to register a request identification and a closed-area network identifier. Among contents of a first record of the main conversion table 2412-1, namely "7821, 2100, 2500, 7200, 2, pr-7821, 1", the 5-th symbol "1" indicates a request identifier. Similar to the embodiment-1 and the embodiment-2, the value " " of the request identification shows the intra-corporation communication. However, in this embodiment-4, the value indicates a subject to be simple-encapsulated.

The sub-conversion table 2412-2 contains a plurality of records, and each of these records contains items which indicate a packet reception priority degree symbol, a protocol priority degree, a TCP socket priority degree, and a UDP socket priority degree. The sub-conversion table 2412-3 contains a plurality of records, and each of these records includes items which represent a protocol priority degree and a protocol sort. The sub-conversion table 2412-4 includes a plurality of records, and each of these records contains items which indicate a TCP socket priority degree, and a socket symbol. The sub-conversion table 2412-5 contains a plurality of records, and each of these records includes items which represent a UDP socket protocol priority degree and a socket symbol. The sub-conversion tables 2412-6 to 2412-7 include a plurality of records, and each of these records contains items which indicate a socket symbol, a packet transmission/reception section, an IP address, and a port number. The packet transmission/reception section corresponds to a section between "From" and "To". This symbol "From" shows a source socket number, and the symbol "To" represents a destination socket number.

In the sub-conversion table 2412-1, for example, a record of a first column thereof is determined in such a manner that when a packet destination internal address is "7821", a packet reception priority symbol is "pr-7821". In other words, the packet reception priority symbol "pr-7821" is determined in an one-to-one correspondence with respect to the internal address "7821" which is applied to the logic terminal 2413.

In the sub-conversion table 2412-2, for example, a record of a first column is determined in such a manner that in correspondence with the packet reception priority symbol "pr-7821", the protocol priority degree is "p-1", the TCP socket priority degree is "t-1", and the UDP socket priority degree is "NULL". In this case, symbol "NULL" represents no designation, the priority degree of which implies the lowermost degree. In the sub-conversion table 2412-3, for instance, a record of a first column is determined in such a manner that the protocol priority degree "p-1" is ordered from protocols "TCP", "UDP", "ICMP" and "IGMP" from the higher degree up to the lower degree. In this example, the priority degree of the upper-grade protocol within the IP packet which is sent out to the communication line connected to the logic terminal 2413 implies "TCP", "UDP", "ICMP" and "IGMP" based upon the above-described designation. The internal address "7821" is applied to the logic terminal 2413.

In the sub-conversion table 2412-4, for instance, a record of a first column is determined in such a manner that the TCP socket priority degree "t-1" is ordered from a socket symbol "sk-1" to a socket symbol "sk-7" from the higher priority degree up to the lower priority degree. In the sub-conversion table 2412-5, for instance, a record of a first column is determined in such a manner that the UDP socket priority degree "u-1" is ordered from a socket symbol "sk-3" to a socket symbol "sk-8" from the higher priority degree up to the lower priority degree. In the sub-conversion table 2412-6, for example, a record of a first column represents that the socket symbol "sk-1" corresponds to a destination number ("To"), the destination IP address corresponds to "2100", and the destination port number corresponds to "30", and the sub-conversion table 2412-7 may be described in a similar manner.

<<Transfer of Internal Packet>>

An external IP packet transmitted from the terminal 2428 of the external IP address "2500" is simple-encapsulated by the access control apparatus 2402 in a similar manner to the simple encapsulation manner as explained in other embodiments, so that the IP packet is converted into an internal packet IF01, and then, the internal packet IF01 is transferred to a communication line provided in the integrated information communication system 2400.

Figure 26:
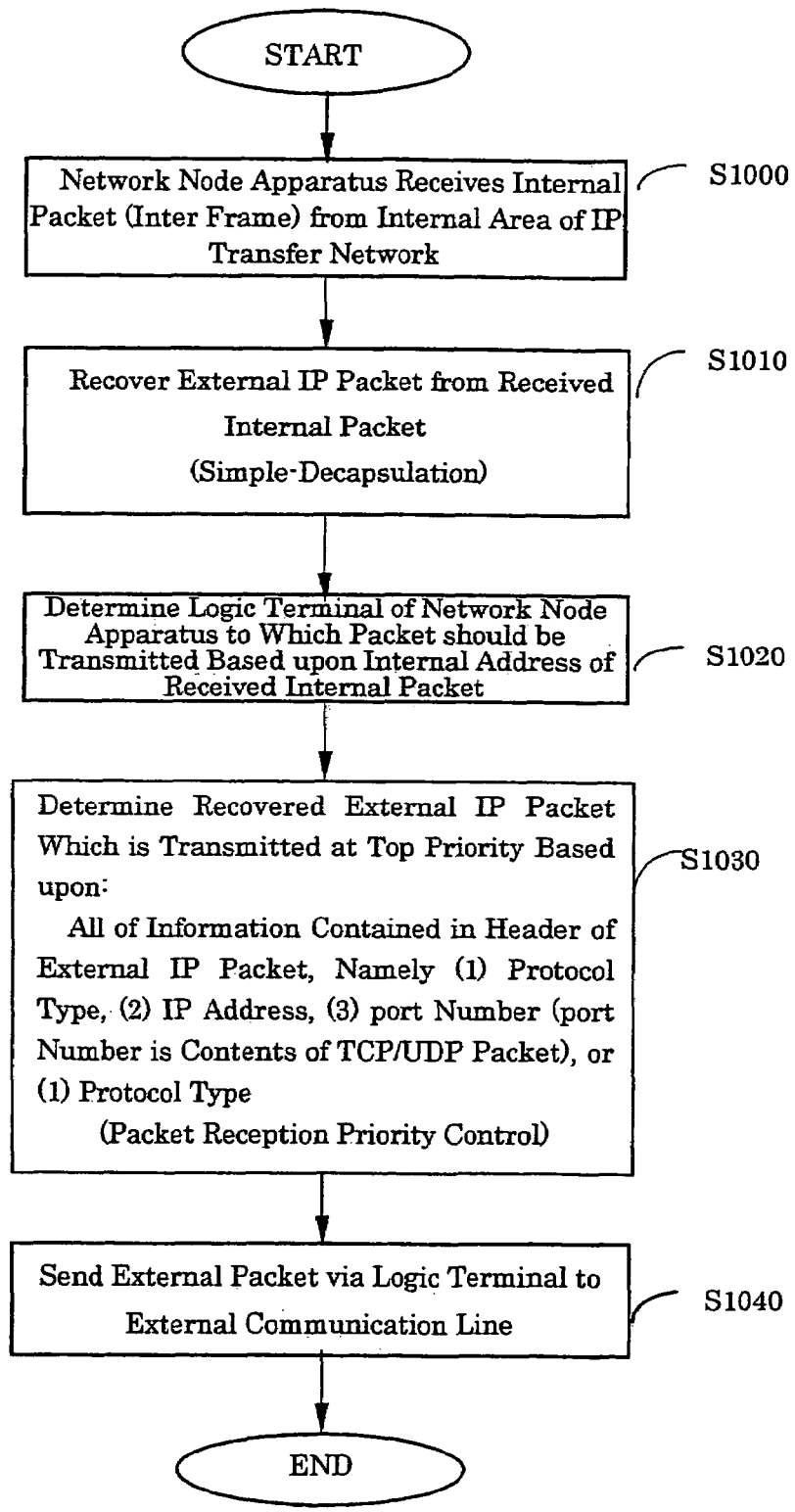
FIG. 26 is a flow chart for explaining a packet reception priority degree in the fourth embodiment.
Figure 29:
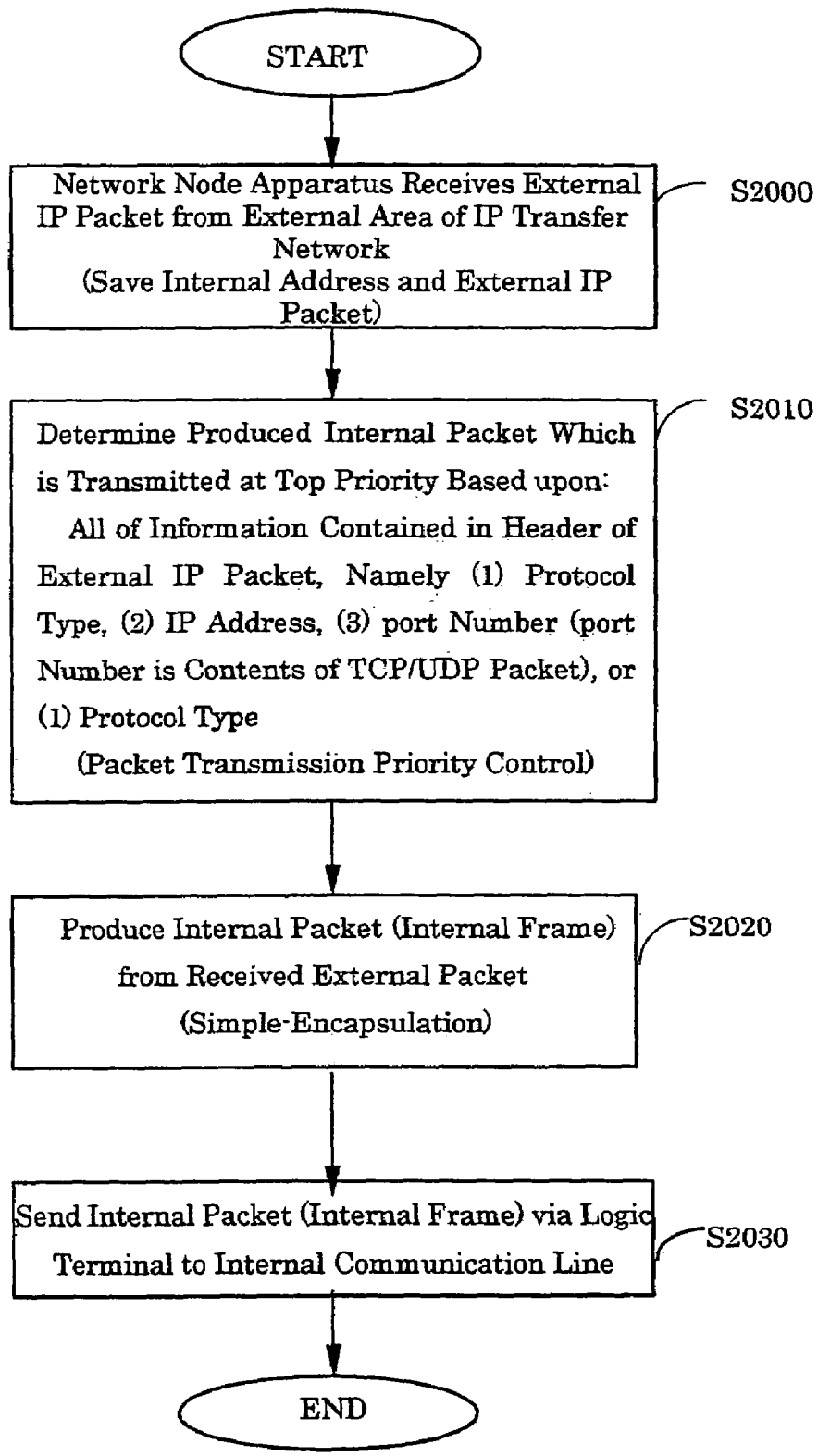
FIG. 29 is a flow chart for explaining a packet transmission priority degree in the fifth embodiment.

While an internal destination address of the internal packet IF01 is equal to "7821", the internal packet IF01 is reached via a communication line employed in the integrated information communication system 2400 (Step S1000 of FIG. 26). Such a record containing the internal address "7821" received by the internal packet IF01, and both a source IP address "2500" and a destination IP address "2100" contained in the received internal packet IF01 corresponds to the record of the first column of the main conversion table 2412-1, so that the packet reception priority degree "pr-7821" of the record is selected. The access control apparatus 2401 removes a simple header of the internal packet IF01 so as to recover the external IP packet (namely, simple-decapsulation at Step S1010). In this example, the destination IP address of this recovered external IP packet is equal to "2100", and the destination port number thereof is equal to "30".

Next, in accordance with the designation of the packet reception priority degree "pr-7821", a protocol priority degree "p-1" is acquired. Also, since the "protocol" contained in the header of the external IP packet is TCP, the TCP socket priority degree is equal to "t-1". It should be noted that in such a case that the "protocol" contained in the header of the external IP packet is UDP, the UDP socket priority degree becomes "NULL", namely, no designation (i.e., lowermost degree of priority degree). Since the protocol priority degree "p-1" is designated, a first column of the sub-conversion table 2412-3 (namely, first item thereof is "p-1") is selected, and then, "TCP, UDP, ICMP, IGMP" are employed as the protocol priority degree. Since the TCP socket priority degree "t-1" is designated, a first column of the sub-conversion table 2412 (namely, first item thereof is "t-1") is selected, and then, as the socket symbol, either "sk-1" or "sk-7" is employed. In this case, both the sub-conversion tables 2412-6 and 2412-7 are retrieved, so that a selection is made of such a socket symbol "sk-1" which contains both the destination address "2100" and the port number "30" provided in the recovered IP packet which is included in the sub-conversion table 2412-6.

The external IP packet EF01 which is obtained by simple-decapsulating the internal packet IF01 is distributed via the communication line 2421 to such a terminal having the destination IP address "2100". Subsequently, internal packets defined from IF02, IF03, IF04, IF05, IF06, IF07, IF08, IF09, IF10 and IF11 provided in the integrated information communication system are processed in a similar manner as indicated in FIG. 26, which will be simply described as follows:

An external IP packet which is sent out from a terminal having the external IP address "2600" employed in the LAN 2409-3 is simple-encapsulated by the access control apparatus 2403 so as to be converted into an internal IP packet IF02. While an internal destination address of the internal packet IF02 is equal to "7821", the internal packet IF02 is transferred via a communication line, and then, is reached to the access control apparatus 2401. A "protocol type" of an external IP packet EF02 which is recovered from the internal IP packet is equal to "TCP", and a "source port number" is equal to "30" in this example. The external IP packet EF02 is delivered via the communication line 2421 to such a terminal having the destination IP address "2110".

An external IP packet which is sent out from a terminal having the external IP address "1230" employed in the LAN 2409-4 is simple-encapsulated by the access control apparatus 2404 so as to be converted into an internal IP packet IF03. While an internal destination address of the internal packet IF03 is equal to "7822", the internal packet IF03 is transferred via a communication line, and then, is reached to the access control apparatus 2401. A "protocol type" of an external IP packet EF03 which is recovered from the internal IP packet is equal to "TCP", and a "source port number" is equal to "30" in this example. The external IP packet EF03 is delivered via the communication line 2422 to such a terminal having the destination IP address "1200".

An external IP packet which is sent out from a terminal having the external IP address "1240" employed in the LAN 2409-4 is simple-encapsulated by the access control apparatus 2404 so as to be converted into an internal IP packet IF04. While an internal destination address of the internal packet IF04 is equal to "7822", the internal packet IF04 is transferred via a communication line, and then, is reached to the access control apparatus 2401. A "protocol type" of an external IP packet EF04 which is recovered from the internal IP packet is equal to "TCP", and a "source port number" is equal to "32" in this example. The external IP packet EF04 is delivered via the communication line 2422 to such a terminal having the destination IP address "1210".

An external IP packet which is sent out from a terminal having the external IP address "1250" is simple-encapsulated by the access control apparatus 2405 so as to be converted into an internal IP packet IF05. While an internal destination address of the internal packet IF05 is equal to "7822", the internal packet IF05 is transferred via a communication line, and then, is reached to the access control apparatus 2401. A "protocol type" of an external IP Packet EF05 which is recovered from the internal IP packet is equal to "TCP", and a "source port number" is equal to "32" in this example. The external IP packet EF05 is delivered via the communication line 2422 to such a terminal having the destination IP address "1220".

An external IP packet which is sent out from a terminal having the external IP address "2610" employed in the LAN 2409-3 is simple-encapsulated by the access control apparatus 2463 so as to be converted into an internal IP packet IF06. While an internal destination address of the internal packet IF06 is equal to "7823", the internal packet IF06 is transferred via a communication line, and then, is reached to the access control apparatus 2401. A "protocol type" of an external IP packet EF06 which is recovered from the internal IP packet is equal to "UDP", and a "destination port number" is equal to "40" in this example. The external IP packet EF06 is delivered via the communication line 2423 to such a terminal having the destination IP address "2200".

An external IP packet which is sent out from a terminal having the external IP address "2700" employed in the LAN 2409-8 is simple-encapsulated by the access control apparatus 2406 so as to be converted into an internal IP packet IF07. While an internal destination address of the internal packet IF07 is equal to "7823", the internal packet IF07 is transferred via a communication line, and then, is reached to the access control apparatus 2401. A "protocol type" of an external IP packet EF07 which is recovered from the internal IP packet is equal to "UDP", and a "source port number" is equal to "40" in this example. The external IP packet EF07 is delivered via the communication line 2423 to such a terminal having the destination IP address "2210".

An external IP packet which is sent out from a terminal having the external IP address "2710" employed in the LAN 2409-8 is simple-encapsulated by the access control apparatus 2406 so as to be converted into an internal IP packet IF08. While an internal destination address of the internal packet IF08 is equal to "7824", the internal packet IF08 is transferred via a communication line, and then, is reached to the access control apparatus 2401. A "protocol type" of an external IP packet EF08 which is recovered from the internal IP packet is equal to "UDP", and a "source port number" is equal to "40" in this example. The external IP packet EF08 is delivered via the communication line 2424 to such a terminal having the destination IP address "2300".

An external IP packet which is sent out from a terminal having the external IP address "2800" employed in the LAN 2409-9 is simple-encapsulated by the access control apparatus 2406 so as to be converted into an internal IP packet IF09. While a packet reception internal address of the internal packet IF09 is equal to "7824", the internal packet IF09 is transferred via a communication line, and then, is reached to the access control apparatus 2401. A "protocol type" of an external IP packet EF09 which is recovered from the internal IP packet is equal to "UDP", and a "source port number" is equal to "42" in this example. The external IP packet EFO9 is delivered via the communication line 2424 to such a terminal having the destination IP address "2310".

An external IP packet which is sent out from a terminal having the external IP address "2720" employed in the LAN 2409-8 is simple-encapsulated by the access control apparatus 2406 so as to be converted into an internal IP packet IF10. While an internal destination address of the internal packet IF10 is equal to "7825", the internal packet IF10 is transferred via a communication line, and then, is reached to the access control apparatus 2401. A "protocol type" of an external IP packet EF10 which is recovered from the internal IP packet is equal to "TCP", and a "source port number" is equal to "60" in this example. The external IP packet EF10 is delivered via the communication line 2425 to such a terminal having the destination IP address "2400".

An external IP packet which is sent out from a terminal having the external IP address "2810" employed in the LAN 2409-9 is simple-encapsulated by the access control apparatus 2407 so as to be converted into an internal IP packet IF11. While an internal destination address of the internal packet IF11 is equal to "7825", the internal packet IF11 is transferred via a communication line, and then, is reached to the access control apparatus 2401. A "protocol type" of an external IP packet EF11 which is recovered from the internal IP packet is equal to "UDP", and a "source port number" is equal to "70" in this example. The external IP packet EF11 is delivered via the communication line 2425 to such a terminal having the destination IP address "2410".

EXAMPLE-1 OF DETERMINING PRIORITY DEGREE

Referring now to a flow chart of FIG. 26, a description is made of how to determine a priority degree in accordance with the present invention.

The access control apparatus 2401 receives both the internal packets IF01 and IF02 of the integrated information communication system at the substantially same time instants from the communication lines of the integrated information communication system network (Step S1000), and simple-decapsulates the respective internal packets so as to obtain the external IP packets EF01 and EF02 (Step S1010). Based upon the conversion table 2412, both the internal addresses of the integrated information communication system applied to the logic terminals of the communication line termination units, through which these external IP packets are transmitted, are equal to "7821". Therefore, it is possible to understand that these internal addresses are made coincident with each other (Step S1020).

Similarly, the packet reception priority degree symbols of these internal packets IF01 and IF02 of the integrated information communication system are equal to "pr-7821". Also, based upon the conversion sub-conversion table 2412-2, "p-1" is designated as to the protocol priority degree corresponding to the symbol "pr-7821"; "t-1" is designated as to the TCP socket priority degree; and "NULL" is designated as to the UDP socket priority degree. Furthermore, when the contents of the sub-conversion table 2412-3 is checked, the following facts can be revealed. That is, from the content of the protocol priority degree "p-1", the protocols of TCP, UDP, ICMP and IGMP are arranged in this order of the higher priority degree. With respect to TCP having a top priority order, based upon the content of the TCP socket priority degree "t-1", the socket symbols "sk-1" and "sk-7" are arranged in this order of the higher priority degree.

Moreover, based upon the content of the socket symbol "sk-1", the IP address which constitutes the destination socket number is equal to "2100", and also the destination port number is equal to "30". The protocol type indicated in the internal packet IF01 of the integrated information communication system is "TCP", the destination IP address thereof is "2100", and also the destination port number thereof is "30". On the other hand, the protocol type indicated in the internal packet IF02 of the integrated information communicating system is "TCP", the destination IP address thereof is "2110", and the destination port number thereof is "30". In this embodiment, the below-mentioned fact can be understood. That is, both the protocol type and the destination socket number are made coincident with the designation of the socket symbol "sk-1", which corresponds to the internal packet IF01 of the integrated information communication system.

With execution of the above-described procedure, it is so determined that the internal packet of the integrated information communication system which is sent out with a top priority is equal to the internal packet IF01 (Step S1030). Next, the internal packet IF01 of the integrated information communication system is transmitted via the logic terminal of the communication line termination unit to the user logic terminal (Step S1040).

EXAMPLE-2 OF DETERMINING PRIORITY DEGREE

The access control apparatus 2401 receives both the internal packets IF03, IF04 and IF05 of the integrated information communication system at the substantially same time instants from the communication lines of the integrated information communication system network (Step S1000), and simple-decapsulates the respective internal packets so as to obtain the external IP packets EF03, EF04 and EF05 (Step S1010). Based upon the conversion table 2412, these internal addresses of the integrated information communication system applied to the communication line termination units, through which these external IP packets are transmitted, are equal to "7822". Therefore, it is possible to understand that these internal addresses are made coincident with each other (Step S1020).

Similarly, the packet reception priority degree symbols of these internal packets IF03, IF04 and IF05 of the integrated information communication system are equal to "pr-7822". Also, based upon the conversion sub-conversion table 2412-2, "p-1" is designated as to the protocol priority degree corresponding to the symbol "pr-7822"; "t-2" is designated as to the TCP socket priority degree; and "NULL" is designated as to the UDP socket priority degree, respectively. Furthermore, the following facts can be revealed. That is, from the content of the protocol priority degree "p-1", the priority degree of TCP is high; and also from the content of the TCP socket priority degree "t-2", the priority degree of the socket symbol "sk-2" is high; and furthermore, from the content of the socket symbol "sk-2", the IP address which constitutes the source socket number is equal to "1240", and the source port number is equal to "32". The protocol type indicated in the internal packet IF03 of the integrated information communication system is "TCP", the source IP address thereof is "1230", and also the source port number thereof is "30". On the other hand, the protocol type indicated in the internal packet IF04 of the integrated information communication system is "TCP", the source IP address thereof is "1240", and the source port number thereof is "32".

Moreover, the protocol type represented in the internal packet IF05 of the integrated information communication system is "TCP", the source IP address thereof is "1250", and the source port number thereof is "32.". In this embodiment, the below-mentioned fact can be understood. That is, both the protocol type and the source socket number are made coincident with the designation of the socket symbol "sk-2", which corresponds to the internal packet IF04 of the integrated information communication system.

With execution of the above-described procedure, it is so determined that the internal packet of the integrated information communication system which is sent out with a top priority is equal to the internal packet IF04 (Step S1040). Next, the internal packet IF04 of the integrated information communication system is transmitted via the logic terminal of the communication line termination unit to the user logic terminal (Step S1050).

EXAMPLE-3 OF DETERMINING PRIORITY DEGREE

The access control apparatus 2401 receives both the internal packets IF06 and IF07 of the integrated information communication system at the substantially same time instants from the communication lines of the integrated information communication system network (Step S1000), and simple-decapsulates the respective internal packets so as to obtain the external IP packets EF06 and EF07 (Step S1010). Based upon the conversion table 2412, both the internal addresses of the integrated information communication system applied to the communication line termination units, through which these external IP packets are transmitted, are equal to "7823". Therefore, it is possible to understand that these internal addresses are made coincident with each other (Step S1020). Similarly, the packet reception priority degree symbols of these internal packets IF06 and IF07 of the integrated information communication system are equal to "pr-7823", "p-2" is designated as to the protocol priority degree corresponding to the symbol "pr-7823"; "u-1" is designated as to the UDP socket priority degree; and "NULL" is designated as to the TCP socket priority degree. Furthermore, the following facts can be revealed. That is, from the content of the protocol priority degree "p-2", the protocols of UDP, TCP, ICMP and IGMP are arranged in this order of the higher priority degree. With respect to UDP having a top priority order, based upon the content of the UDP socket priority degree "t-1", the socket symbols "sk-3" and "sk-8" are arranged in this order of the higher priority degree.

Moreover, based upon the content of the socket symbol "sk-3", the IP address which constitutes the destination socket number is equal to "2200", and also the destination port number is equal to "40". The protocol type indicated in the internal packet IF06 of the integrated information communication system is "UDP", the destination IP address thereof is "2200", and also the destination port number thereof is "40". On the other hand, the protocol time indicated in the internal packet IF07 of the integrated information communicating system is "UDP", the destination IP address thereof is "2110", and the destination port number thereof is "40". In this embodiment, the below-mentioned fact can be understood. That is, both the protocol type and the destination socket number are made coincident with the designation of the socket symbol "sk-3", which corresponds to the internal packet IF06 of the integrated information communication system.

With execution of the above-described procedure, it is so determined that the internal packet of the integrated information communication system which is sent out with a top priority is equal to the internal packet IF06 (Step S1040). Next, the internal packet IF06 of the integrated information communication system is transmitted via the logic terminal of the communication line termination unit to the user logic terminal (Step S1050).

EXAMPLE-4 OF DETERMINING PRIORITY DEGREE

The access control apparatus 2401 receives both the internal packets IF08 and IF09 of the integrated information communication system at the substantially same time instants from the communication lines of the integrated information communication system network (Step S1000), and simple-decapsulates the respective internal packets so as to obtain the external IP packets EF08 and EF09 (Step S1010). Based upon the conversion table 2412, both the internal addresses of the integrated information communication system applied to the communication line termination units, through which these external IP packets are transmitted, are equal to "7824". Therefore, it is possible to understand that these internal addresses are made coincident with each other (Step S1020).

Similarly, the packet reception priority degree symbols of these internal packets IF08 and IF09 of the integrated information communication system are equal to "pr-7824", "p-2" is designated as to the protocol priority degree corresponding to the symbol "pr-7824'; "u-2" is designated as to the UDP socket priority degree; and "NULL" is designated as to the TCP socket priority degree. Furthermore, the following facts can be revealed. That is, from the content of the protocol priority degree "p-2", the priority degree of the socket symbol "sk-4" is high; and furthermore, from the content of the socket symbol nsk-4", the IP address which constitutes the source socket number is equal to "2710", and the source port number is equal to "40". The protocol type indicated in the internal packet IF08 of the integrated information communication system is "UDP", the source IP address thereof is "2710", and also the destination port number thereof is "40".

On the other hand, the protocol type indicated in the internal packet IF09 of the integrated information communicating system is "UDP", the source IP address thereof is "2800", and the source port number thereof is "42". In this embodiment, the below-mentioned fact can be understood. That is, both the protocol type and the source socket number are made coincident with the designation of the socket symbol "sk-4", which corresponds to the internal packet IF08 of the integrated information communication system.

With execution of the above-described procedure, it is so determined that the internal packet of the integrated information communication system which is sent out with a top priority is equal to the internal packet IF08(Step S1040). Next, the internal packet IF08 of the integrated information communication system is transmitted via the logic terminal of the communication line termination unit to the user logic terminal (Step S1050).

<<Brief Summary>>

As previously explained, in accordance with the above embodiment, the integrated information communication system is featured by that the packet reception priority degrees are controlled by employing the sub-conversion table which is referred based upon the packet reception priority symbol. With reference to the upper-grade protocol contained in the IP packet, in response to the sort of the upper-grade protocol, the priority degree for the next stage of such an internal packet which is reached from the internal area of the integrated information communication system to the access control apparatus may be selected by designating the record of the conversion table provided in the access control apparatus. Also, in the case that the upper-grade protocol is TCP, the priority degree may be selected with respect to each of the upper-grade port numbers. When the upper-grade protocol is UDP, the priority degree may be selected with respect to each of the upper-grade port numbers.

Figure 22:
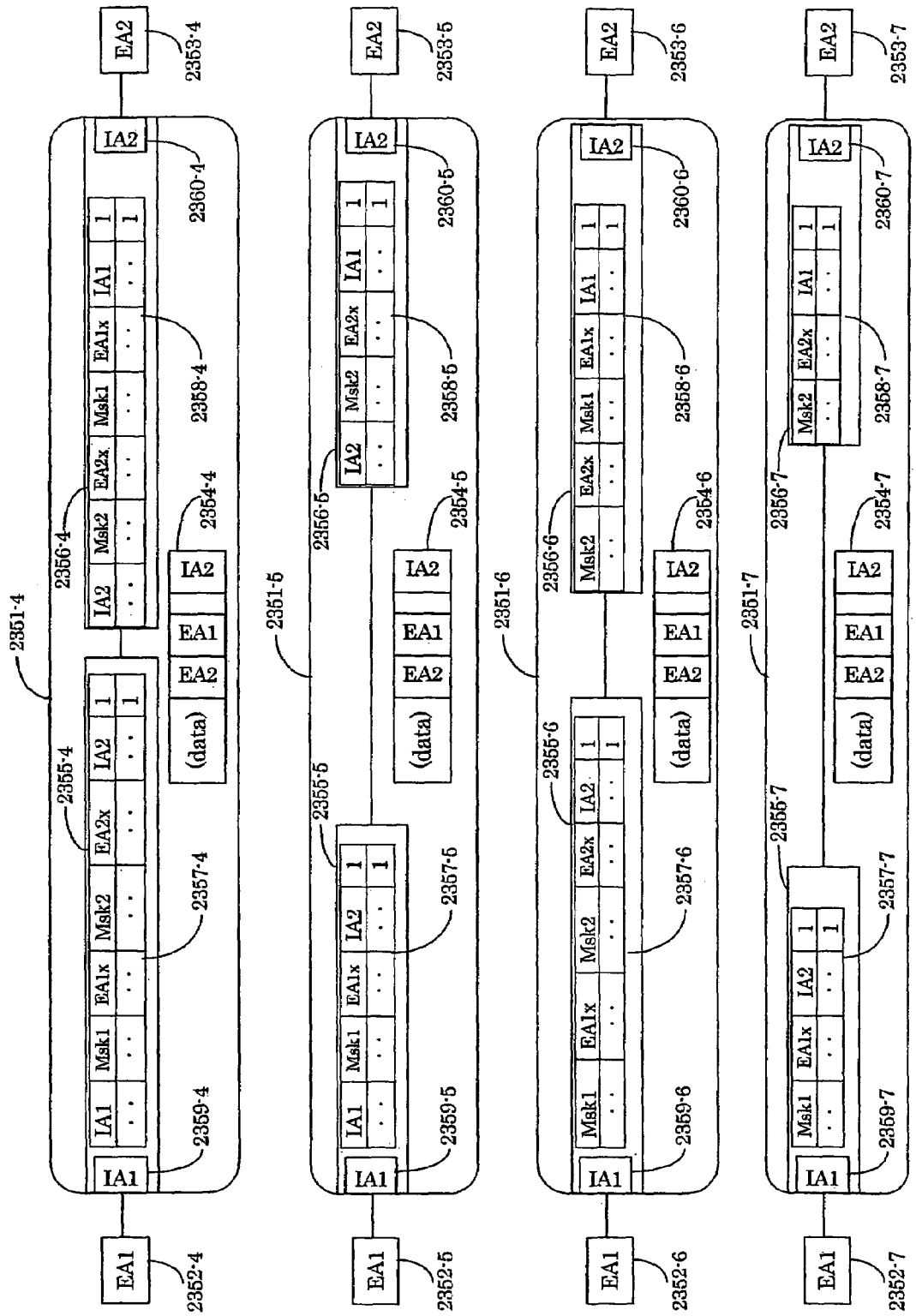
FIG. 22 is a diagram for showing a function of a conversion table and a transfer operation of an internal packet in the third embodiment.

In addition, the conversion table 2412 may be carried out by replacing the present format thereof by such a format containing the address mask as previously explained in the embodiment 3 with reference to FIG. 19 and FIG. 22. Alternatively, the conversion table 2454 may be executed by employing such a format that the external source address as explained with reference to FIG. 19 and FIG. 21 is omitted.

5. Embodiment-5 (Packet Transmission Priority Control of Simple-Capsulation)

In this embodiment-5, an external IP packet arrived at an integrated information communication system is simple-encapsulated by an access control apparatus with employment of a conversion table contained in the access control apparatus. Thereafter, priority orders of the simple-encapsulated IP packets, at which these IP packets are sent out to a communication line provided in the integrated information communication system, may be determined. This priority order decision will now be explained.

<<Arrangement>>

As indicated in FIG. 27, an integrated information communication system (2450) contains access control apparatus 2451, 2452-1 to 245211 and the access control apparatus 2451 contains a conversion table 2454. Reference numerals 24561 to 2456-5 each indicate a LAN. Each of these LANs is connected via a communication line to any one of the access control apparatus 2451 in the integrated information communication system 2450. Each of these LANs contains a plurality of IP terminals. Reference numerals 2457-1 to 2457-11 show IP terminals having IP packet transmission/reception functions. An external IP packet corresponds to either Ipv4 or Ipv6. An internal packet may be performed by employing an HDLC frame or an MPLS frame, and contains both a destination address and an information portion, as indicated in FIG. 20 of the previously embodiment. When an HDLC frame for an optical link line (WDM trunk line) is employed, a destination address is equal to such a destination address which is defined by the HDLC technical method. When the MPLS frame is employed, a destination address is equal to a label which is defined by the MPLS technical method.

<<Conversion Table>>

Referring now to FIG. 28, a conversion table 2454 is constructed of a main conversion table 2454-1, and sub-conversion tables 2454-2 to 2454-7. The main conversion table 2454-1 includes at least an item used to register a packet transmission priority symbol in combination with the registration items of the conversion table as explained in another embodiment. In this embodiment, the main conversion table 2454-1 further contains items which are used to register a request identification and a closed-area network identifier.

Among contents of a first record of the conversion table 2454-1, namely "7821, 2100, 2500, 7200, 1, pr7200, 2", the 5-th symbol "1" indicates a request identifier. Similar to the embodiment-1 and the embodiment-2, the value "1" of the request identification shows the intra-corporation communication. However, in this embodiment-5, the value indicates a subject to be simple-encapsulated.

The sub-conversion table 2454-2 includes a plurality of records. Each of the records contains such items indicative of a packet transmission priority symbol, a TCP socket priority degree and a UDP socket priority degree. Also, the sub-conversion table 2454-3 includes a plurality of records, and each of these records contains items indicative of a protocol priority degree, and a protocol sort. The sub-conversion table 2454-4 includes a plurality of records, and each of these records contains items representative of a TCP socket priority degree and a socket symbol. The sub-conversion table 2454-5 includes a plurality of records, and each of these records contains items representative of a UDP socket priority degree and a socket symbol. The sub-conversion tables 2454-6 to 2454-7 include a plurality of records, and each of these records contains items indicative of a socket symbol, a packet transmission/reception section (section between "From" and "To"), an IP address and a port number. The symbol "From" shows a source socket number, and the symbol "To" indicates a destination socket number.

In the main conversion table 2454-1, for instance, a record of a first column thereof contains a packet transmission priority symbol. In this example, the packet transmission priority symbols are determined in correspondence with the communication lines provided inside the integrated information communication system 2450.

A packet transmission priority degree "ps-7200" is applied to such internal communication lines of the integrated information communication system 2450, which are directed to the access control apparatus 2452-1 and 2452-2. A packet transmission priority degree "ps-7300" is applied to such internal communication lines of the integrated information communication system 2450, which are directed to the access control apparatus 2452-3 and 2452-4. A packet transmission priority degree "ps-7400" is applied to such internal communication lines of the integrated information communication system 2450, which are directed to the access control apparatus 2452-5 and 2452-6. A packet transmission priority degree "ps-7500" is applied to such internal communication lines of the integrated information communication system 2450, which are directed to the access control apparatus 2452-7 and 2452-8. Also, a packet transmission priority degree "ps-7600" is applied to such internal communication lines of the integrated information communication system 2450, which are directed to the access control apparatus 2452-9, 2452-10, and 2452-11.

In the sub-conversion table 2454-2, for example, a record of a first column thereof is determined in such a manner that in correspondence with the packet transmission priority symbol "pr-7200", the protocol priority degree is "p-21", the TCP socket priority degree is "t-21", and the UDP socket priority degree is "NULL". In this case, symbol "NULL" represents no designation, the priority order of which implies the lowermost degree. In the sub-conversion table 2454-3, for instance, a record of a first column thereof is determined in such a manner that the protocol priority degree "p-21" is ordered from protocols "TCP", "UDP", "ICMP" and "IGMP" from the higher degree up to the lower degree. In the sub-conversion table 2454-4, for instance, a record of a first column thereof is determined in such a manner that the TCP socket priority degree "t-21" is ordered from a socket symbol "sk-21" to a socket symbol "sk-27" from the higher priority degree up to the lower priority degree.

In the sub-conversion table 2454-5, for instance, a record of a first column thereof is determined in such a manner that the UDP socket priority degree "u-21" is ordered from a socket symbol "sk-23" to a socket symbol "sk-28" from the higher priority degree up to the lower priority degree. In the sub-conversion table 2454-6, for example, a record of a first column thereof represents that the socket symbol "sk-21" corresponds to a source socket number ("From"), the source IP address corresponds to "2100", and the source port number corresponds to "30", and the sub-conversion table 2454-7 may be described in a similar manner.

EXAMPLE-1 OF DETERMINING PRIORITY DEGREE

The access control apparatus 2451 receives an external IP packet F01 from a logic terminal 2460 to which an internal address "7821" is applied, receives an external IP packet F02 from a logic terminal 2461 to which an internal address "7822" is applied, and receives the above-described two IP packets at the substantially same time instants. In this example, a payload of the external IP packet F01 is equal to TCP, and a payload of the external IP packet F02 is equal to UDP. The access control apparatus 2451 saves therein a set of the acquired internal address "7821" and the acquired external IP address F01, and also, a set of the internal address "7822" and the external IP packet F02 (Step S2000). Then, a procedure of controlling the packet transmission priority degree is carried out as follows:

<<Calculation-1 of IP Packet Transmission Priority Degree>>

Such a record which contains the previously acquired internal address "7821", the external destination address "2500" contained in the external IP packet F01, and the source external address "2100" corresponds to a record of a first column of the main conversion table 2454-1 (see FIG. 28). The packet transmission priority symbol of this record is designated as "ps-7200" in this record. Also, based upon the sub-conversion table 2454-2, "p-21" is designated to the protocol priority degree corresponding to the packet transmission priority symbol "ps-7200"; "t-21" is designated to the TCP socket priority degree; and "NULL" is designated to the UDP socket priority degree.

Furthermore, when the content of the sub-conversion table 2454-3 is checked, it can be understood from the content of the protocol priority degree "p-21" that the priority degrees of the protocols TCP, UDP, ICMP, and IGMP are high in this order. Similar to the above-described case, the packet transmission priority symbol of the external IP packet F02 is equal to "ps-7200" based upon the designation of the main conversion table 2454-1. Since an "upper-grade protocol" employed inside the external IP packet F01 is equal to TCP and also an "upper-grade protocol" of the external IP packet F02 is equal to UDP, the external IP packet F01 having the higher TCP priority degree is selected by designating the protocol priority degree "p-21". Next, the external IP packet F02 is selected. As apparent from the foregoing description, it is so determined that such an external IP packet which should be simple-encapsulated and then be sent out at a top priority order is equal to the external IP packet F01 (Step S2010).

Finally, while the external IP packet F01 is simple-encapsulated (Step S2020), such an internal packet IF01 obtained by simple-encapsulating the external IP packet F01 is transmitted to the internal area of the integrated information communication system 2450 with having a top priority order (Step S2030). Subsequently, such an internal packet IF02 is transmitted which is obtained by simple-encapsulating the external IP packet F02.

EXAMPLE-2 OF DETERMINING PRIORITY DEGREE

The access control apparatus 2451 receives an external IP packet F03 from the logic terminal 2460 to which the internal address "7821" is applied, receives an external IP packet F04 from the logic terminal 2461 to which the internal address n7822 is applied, and receives the above-described two IP packets at the substantially same time instants. In this example, a payload of the external IP packet F03 is equal to TCP, a port number thereof is "30", and a payload of the external IP packet F04 is equal to TCP, a port number thereof is "32". The access control apparatus 2451 saves therein a set of the acquired internal address "7831" and the acquired external IP address F03, and also, a set of the internal address "7822" and the external IP packet F04 (Step S2000). Then, a procedure of controlling the packet transmission priority degree is carried out as follows:

<<Calculation-2 of IP Packet Transmission Priority Degree

Such a record which contains the previously acquired internal address "7821", the external destination address "2610" contained in the external IP packet F03, and the external source address "2110" corresponds to a record of a second column of the main conversion table 2454-1 (see FIG. 28). The packet transmission priority symbol of this record is designated as "ps-7300" in this second record. Also, based upon the sub-conversion table 2454-2, "p-21" is designated to the protocol priority degree corresponding to the packet transmission priority symbol "ps-7300"; "t-22" is designated to the TCP socket priority degree; and "NULL" is designated to the UDP socket priority degree.

Furthermore, when the content of the sub-conversion table 2454-3 is checked, it can be understood from the content of the protocol priority degree "p-21" that the priority degrees of the protocols TCP, UDP, ICMP and IGMP are high in this order. Both an "upper-grade protocol" contained in the external IP packet F03 and an "upper-grade protocol" contained in the external IP packet F04 are equal to TCP; a source IP address of the external IP packet F03 is equal to "2110"; and a source port number is equal to "30". On the other hand, a first column of the sub-conversion table 2454-6 describes that the socket symbol is "sk-21"; the source IP address is "2110"; and the source port number is "30". As a result, since the external IP packet F03 corresponds to the socket symbol "sk-21", the priority degree is applied to this external IP packet F03.

A source IP address of the external IP packet F04 is equal to "1210", a destination IP address thereof is equal to "1230", and a destination port number thereof is equal to "32". There is no such a socket symbol in the second of the sub-conversion table 2454-6, in which the source IP address is "1210" and the destination port number is "30". Furthermore, there is no such a socket symbol in this record of the sub-conversion table 2454-6, in which the destination IP address is "1230", and the destination port number is "32". In other words, since there is no such a socket number corresponding to the external IP packet F04, the priority degree is not applied to the external IP packet F04. As described above, the external IP packet F03 having the high priority degree is selected, and thereafter, the external IP packet F04 is selected. As apparent from the foregoing description, it is so determined that such an external IP packet which should be simple-encapsulated and then be sent out at a top priority order is equal to the external IP packet F03 (Step S2010).

Next, while this external IP packet F03 is simple-encapsulated (step S2020), such an internal packet IF03 obtained by simple-encapsulating the external IP packet F03 is transmitted to the internal area of the integrated information communication system 2450 with having a top priority order (Step S2030). Subsequently, such an internal packet IF04 is transmitted which is obtained by simple-encapsulating the external IP packet F04.

EXAMPLE-3 OF DETERMINING PRIORITY DEGREE

The access control apparatus 2451 receives an external IP packet F09 from a logic terminal 2462 to which an internal address "7823" is applied, receives an external IP packet F10 from a logic terminal 2463 to which an internal address "7824" is applied, and receives an external IP packet F11 from a logic terminal 2464 to which an internal address "7825" is applied, and receives the above-described three IP packets at the substantially same time instants. In this example, a payload of the external IP packet F09 is equal to UDP, a port number thereof is 40; a payload of the external IP packet F10 is UDP, a port number thereof is 42; and a payload of the external IP packet F11 is UDP, a port number thereof is 70. The access control apparatus 2451 saves therein a set of the acquired internal address "7823" and the acquired external IP address F09, and a set of the internal address "7824" and the external IP packet F11, and also a set of the internal address "7825" and the external IP packet F11 (Step S2000). Then, a procedure of controlling the packet transmission priority degree is carried out as follows:

<<Calculation-3 of IP Packet Transmission Priority Degree>>

Such a record which contains the previously acquired internal address "7823", the destination external address "2720" contained in the external IP packet F09, and the external source address "2210" corresponds to a record of a seventh column of the main conversion table 2454-1. The packet transmission priority symbol of this seventh record is designated as "ps-7600" in this record. Also, based upon the sub-conversion table 2454-2, "p-21" is designated to the protocol priority degree corresponding to the packet transmission priority symbol "ps-7600"; "t-23" is designated to the TCP socket priority degree; and "u-23" is designated to the UDP socket priority degree.

Furthermore, when the content of the sub-conversion table 2454-3 is checked, it can be understood from the content of the protocol priority degree "p-21" that the priority degrees of the protocols TCP, UDP, ICMP, and IGMP are high in this order. "Upper-grade protocols" employed in the external IP packet F09, in the external IP packet F10, and also in the external IP packet F11 are equal to "UDP", and UDP socket priority degrees thereof are equal to "u-23". Furthermore, while socket symbols "sk-28" and "sk-24" are selected by designating the sub-conversion table 2454-5, the external IP packet F09 whose destination IP address is "2210" and whose destination port number is "40" corresponds to the socket symbol "sk-24" by employing the sub-conversion table 2454-6, and also the external IP packet F11 whose source IP address is "2410" and whose destination port number "70" corresponds to the socket symbol "sk-28" by employing the sub-conversion table 2454-7. Since the UDP socket symbol "u-23" of the sub-conversion table 2454-5 is designated, the priority degree of the socket symbol "sk-28" is the highest priority degree, and the socket symbol "sk-24" owns the second highest priority degree. The external IP packet F11 corresponds to the socket symbol "sk-28", and the external IP packet F09 corresponds to the socket symbol "sk-24". Since there is no socket symbol corresponding to the external IP packet F10, this socket symbol owns the lowermost priority degree.

As previously explained, the external IP packet F11 having the high priority degree is selected, and then, the external IP packet F09 is selected, and finally, the external IP packet F10 is selected. With execution of the above-explained operation, the external IP packet F09 and the external IP packet F10 are simple-encapsulated in this order (Step S2020). Then, these IP packets are sequentially transmitted to the internal unit of the integrated information communication system 2450 (Step S2030).

<<Closed-Area Network Identifier>>

It should also be noted that a close-area network identifier contained in the main conversion table 2454-1 is used so as to discriminate a closed-area network to which a transmission terminal belongs from another closed-area network to which a reception terminal belongs. For instance, all of values of closed-area network identifiers are equal to "2", which are contained in a first record to a sixth record of the main conversion table 2454-1. All of the external source IP addresses "2100", "2110", . . . , which are contained in these first to sixth records, and all of the destination external IP addresses "2500", "2610", . . . , which are contained in these first to sixth records are handled based upon the closed-area network identifier "2" in such a manner that these transmission source/destination external IP addresses belong to the same closed-area network. Thus, the IP packet transmission/reception operation is carried out only among such terminals belonging to the same closed-area network.

<<Brief Summary>>

As previously described, in accordance with this fifth embodiment, the integrated information communication system is featured by that the packet transmission priority degree can be controlled by employing the sub-conversion table with reference to the packet transmission priority symbol. Referring to the upper-grade protocol contained in the IP packet, the priority degree of the external packet at the next stage, which is received from the external unit of the integrated information communication system to the access control apparatus, may be selected in response to the sort of the upper-grade protocol by designating the record of the conversion table employed in this access control apparatus. Also, in the case that the upper-grade protocol corresponds to TCP, the priority order may be selected every upper-grade port number. In the case that the upper-grade protocol corresponds to UDP, the priority degree may be selected with respect to each of the upper-grade port numbers.

In addition, the conversion table 2454 may be carried out by replacing the present format thereof by such a format containing the address mask as previously explained in the embodiment 3 with reference to FIG. 19 and FIG. 22. Alternatively, the conversion table 2454 may be executed by employing such a format that the external source address as explained with reference to FIG. 19 and FIG. 20 is omitted.

As previously described, in accordance with the present invention, while the communication is carried out by way of the virtual dedicated line and/or the communication is carried out by employing the private address, the external packet is encapsulated so as to be converted into the internal packet and this internal packet is transferred by the access control apparatus, whereas while the non-private address communication is carried out, in the integrated information communication network in which the external packet is transferred without being encapsulated, the packet filters are provided in the access control apparatus and the boundary relay apparatus, respectively. As a result, when the packet filter employed in the access control apparatus detects such a fact that the destination-address contained in the external packet is equal to the address which is not opened outside the network, this packet filter discards the external packet. Also, when the packet filter employed in the boundary relay apparatus detects such a fact that the internal packet corresponding to the internal address of the communication company passes through the own packet filter, this packet filter discards the internal packet. As a result, it is possible to avoid that such an IP packet which is exclusively employed inside the communication company is leaked into other communication company management networks. Also, it is possible to prevent the unwanted IP packet issued from another communication company from being entered into the own management network. Since either the encryption or the digital signature is applied which can be agreed by the communication companies for transmitting/receiving the IP packets, such an IP packet transfer operation can be carried out by further improving the information security.

In the private address communication, the IP header is applied to the external packet which is reached via the communication line of the external area to the access control apparatus under management of the conversion table of the access control apparatus (namely, IP encapsulation case of layer 3 communication), or the simple header is applied to the external packet (namely, encapsulation case of communication less than 3 of layer). Thus, the external packet is converted into the internal packet, and thereafter, the internal packet is transferred into the internal area of the integrated information communication network to be reached to another access control apparatus by which the external packet is recovered from this internal packet. Then, the recovered external packet is transferred to the communication line provided outside the integrated information communication system. As a consequence, it is possible to avoid the multiple use of the private addresses having the same values which are employed among the different LANs.

The priority degree of the internal packet at the next stage, which is reached from the integrated information communication system to the access control apparatus, may be selected in response to the sort of the upper-grade protocol with reference to the upper-grade protocol used inside the recovered IP packet.

Furthermore, referring to the upper-grade protocol contained in the external packet which is reached form the external area of the integrated information communication system to the access control apparatus, the priority degree of the external packet at the next stage may be selected in response to the sort of the viewed upper-grade protocol.

Also, while items of source transmitting permission, source receiving permission and destination transmitting permission are optionally provided at the record in the conversion table, the transmitting and receiving of the internal packet can be controlled.

What is claimed is:

1. An integrated information communication system, comprising:
   a first access control apparatus for receiving an external packet via an external communication line and for converting the external packet into an internal packet by assigning the external packet with a simple header based on a conversion table in said access control apparatus, wherein
   said external packet includes an external source address and an external destination address,
   said simple header includes an internal destination address and an information section;
   a network for transferring the internal packet to a second access control apparatus associated to said internal destination address,
   wherein when a set of three addresses comprising a source internal address assigned to a logic terminal of a communication line termination receiving said external packet, the external destination address of said received external packet and the external source address of the received external packet is registered as a record in the conversion table of said first access control apparatus, said external packet is converted into said internal packet.

2. The integrated information communication system of claim 1 wherein the conversion table comprises at least two records having each a different destination address and a different internal address assigned to a logic terminal of a communication line terminal, whereby a transfer destination of said internal packet is changeable by changing the external destination address of the received external packet.

3. An integrated information communication system as claimed in claim 1, wherein the IP packets are associated with communication protocol types, and wherein the second access control apparatus is provided for assigning a predetermined priority level to the IP packets in accordance with the type of protocol the IP packets are associated with.

4. An integrated information communication system as claimed in claim 3, wherein when said protocol is TCP, and wherein said priority level have a predetermined value for every internal source address.

5. An integrated information communication system as claimed in claim 3, wherein when said protocol is UDP, and wherein said priority level have a predetermined value for every internal source address.

6. An integrated information communication system as claimed in claim 1, wherein the IP packets are associated with communication protocol types, and wherein the second access control apparatus is provided for assigning a predetermined priority level to the external packet reached in accordance with the type of protocol the IP packet is associated with.

7. An integrated information communication system as claimed in claim 6, wherein when said protocol is TCP, said priority level have a predetermined value for every internal source address.

8. An integrated information communication system as claimed in claim 6, wherein when said protocol is UDP, said priority level have a predetermined value for every internal source address.

9. An integrated information communication system comprising:
  a first access control apparatus for receiving an external packet via an external communication line and for converting the external packet into an internal packet by assigning the external packet with a simple header based on a conversion table in said access control apparatus, wherein
  said external packet includes an external source address and an external destination address,
  said simple header includes an internal destination address and an information section;
  a network for transferring the internal packet to a second access control apparatus associated to said internal destination address,
  wherein when a set of three addresses comprising a source internal address assigned to a logic terminal of a communication line termination receiving said external packet, the external destination address of said received external packet and the external source address of the received external packet is registered as a record in the conversion table of said first access control apparatus, is said external packet converted into said internal packet
  wherein the record further comprises an address mask, and wherein said external packet is converted into said internal packet if a logical product of the mask and the external destination address of the received packet coincides with the external destination address in the record.

10. An IP communication system for transferring IP packets with priority control by using a destination port number, wherein:
  an IP network is constructed by connecting plural access control apparatus via communication lines;
  each of said access control apparatus has plural logical terminals and a conversion table, and said conversion table includes a port table,
  an access control apparatus AC1 includes a conversion table H1, an access control apparatus AC2 includes a conversion table H2, and a port table in said conversion table H2 includes a combination of a receiver priority and a destination port number,
  a terminal T1 is connected to a logical terminal LP1 of said access control apparatus AC1 via a communication line L1, and a terminal T2 is connected to a logical terminal LP2 of said access control apparatus AC2 via a communication line L2,
  said terminal T1 sends an external IP packet to said communication line L11, said external IP packet is inputted to said access control apparatus AC1 from said logical terminal LP1, said access control apparatus AC1 obtains an internal destination address 2, with reference to said conversion table H1, based on both a destination external IP address in said external IP packet and a discrimination information for discriminating said logical terminal LP1,
  said access control apparatus AC1 forms an internal IP packet including said external IP packet and said internal destination address 2 as its destination address, and said access control apparatus AC1 sends said internal IP packet to said access control apparatus AC2,
  when said access control apparatus AC2 receives said internal IP packet, said access control apparatus AC2 references a pair of a receiver priority and a destination port number of a port table in said conversion table H2, and said access control apparatus AC2 judges whether said destination port number coincides with a destination port number included in said external IP packet in said internal IP packet or not,
  in a case that said destination port number does not coincide with said destination port number included in said external IP packet, said access control apparatus AC2 discards said internal IP packet including said external IP packet,
  in a case that said destination port number coincides with said destination port number included in said external IP packet, said access control apparatus AC2 decides an order to send said internal IP packet from said logical terminal LP2 in accordance with said receiver priority, and
  whereby said access control apparatus AC2 restores said external IP packet from said internal IP packet, and said restored external IP packet is sent to said terminal T2 via logical terminal LP2 and said communication line L2.

11. An IP communication system for transferring IP packets with priority control by using a destination port number, wherein:
  an IP network is constructed by connecting plural access control apparatus via communication lines,
  each of said access control apparatus has plural logical terminals and a conversion table, and said conversion table includes a port table,
  an access control apparatus AC1 includes a conversion table H1, an access control apparatus AC2 includes a conversion table H2, and a port table in said conversion table H1 includes a combination of a sender priority and a destination port number,
  a terminal T1 is connected to a logical terminal LP1 of said access control apparatus AC1 via a communication line Li, and a terminal T2 is connected to a logical terminal LP2 of said access control apparatus AC2 via a communication line L2, said terminal T1 sends an external IP packet to said communication line L1, said external IP packet is inputted to said access control apparatus AC1 from said logical terminal LP1, said access control apparatus AC1 obtains an internal destination address 2, with reference to said conversion table H1, based on both a destination external IP address in said external IP packet and a discrimination information for discriminating said logical terminal LP1, said access control apparatus AC1 references a pair of a sender priority and a destination port number of a port table in said conversion table H1, and said access control apparatus AC1 judges whether said destination port number coincides with a destination port number included in said external IP packet, in a case that said destination port number does not coincide with said destination port number included in said external IP packet, said access control apparatus AC1 discards said external IP packet, in a case that said destination port number coincides with said destination port number included in said external IP packet, said access control apparatus AC1 forms an internal IP packet including said external IP packet and said internal destination address 2 as its destination address, and said access control apparatus AC1 decides an order to send said internal IP packet to said access control apparatus AC2 in accordance with said sender priority, and whereby said access control apparatus AC1 sends said formed internal IP packet to said access control apparatus AC2, said access control apparatus AC2 restores said external IP packet from said internal IP packet, and said restored external IP packet is sent to said terminal T2 via logical terminal LP2 and said communication line L2.

* * * * *